(12) United States Patent
Herbon et al.

(10) Patent No.: US 11,274,212 B2
(45) Date of Patent: Mar. 15, 2022

(54) THERMAL AND/OR FIRE RESISTANT PANEL, A MOUNTING ASSEMBLY, AND A KIT

(71) Applicant: CBG SYSTEMS INTERNATIONAL PTY LTD, Derwent Park (AU)

(72) Inventors: Roberto Javier Herbon, Derwent Park (AU); Lukas Krellmann, Derwent Park (AU); Carmelo Dell'Olio, Clayton (AU)

(73) Assignee: CBG SYSTEMS INTERNATIONAL PTY LTD, Derwent Park (AU)

(*) Notice: Subject to any disclaimer, the term of this patent is extended or adjusted under 35 U.S.C. 154(b) by 0 days.

(21) Appl. No.: 16/637,145

(22) PCT Filed: May 17, 2019

(86) PCT No.: PCT/AU2019/050474
§ 371 (c)(1),
(2) Date: Feb. 6, 2020

(87) PCT Pub. No.: WO2019/222793
PCT Pub. Date: Nov. 28, 2019

(65) Prior Publication Data
US 2021/0108087 A1 Apr. 15, 2021

(30) Foreign Application Priority Data
May 19, 2018 (AU) .................. 2018901758

(51) Int. Cl.
*C09D 1/02* (2006.01)
*C08K 3/016* (2018.01)
(Continued)

(52) U.S. Cl.
CPC ............. *C09D 1/02* (2013.01); *C08K 3/016* (2018.01); *C08K 3/34* (2013.01); *E04B 1/7675* (2013.01);
(Continued)

(58) Field of Classification Search
CPC .. C09D 1/02; C08K 3/016; C08K 3/34; E04B 1/7675; E04B 1/942; E04B 9/045;
(Continued)

(56) References Cited

U.S. PATENT DOCUMENTS 6,159,606 A 12/2000 Gelderie et al.

FOREIGN PATENT DOCUMENTS

| CN | 106639066 A | 5/2017 |
|----|-------------|--------|
| JP | H04101842 A | 4/1992 |

(Continued)

OTHER PUBLICATIONS

English machine translation of JP 04-101843A. (Year: 1992).*
(Continued)

*Primary Examiner* — John E Uselding
(74) *Attorney, Agent, or Firm* — Meunier Carlin & Curfman LLC

(57) ABSTRACT

Disclosed herein is a thermal and/or fire resistant panel comprising: a panel body comprising a fire resistant composition, wherein the fire resistant composition comprises: a silane cross-linked hybrid inorganic polymer; and a siloxane.

17 Claims, 32 Drawing Sheets

(51) Int. Cl.
*C08K 3/34* (2006.01)
*E04B 1/76* (2006.01)
*E04B 1/94* (2006.01)
*E04B 9/04* (2006.01)
*E04B 9/14* (2006.01)
*E04B 9/24* (2006.01)
*E04C 2/04* (2006.01)
*E04C 2/20* (2006.01)
*E04F 13/18* (2006.01)

(52) U.S. Cl.
CPC .............. *E04B 1/942* (2013.01); *E04B 9/045* (2013.01); *E04B 9/14* (2013.01); *E04B 9/244* (2013.01); *E04C 2/049* (2013.01); *E04C 2/20* (2013.01); *E04F 13/18* (2013.01); *E04B 2103/04* (2013.01); *E04F 2290/045* (2013.01)

(58) Field of Classification Search
CPC . E04B 9/14; E04B 9/244; E04C 2/049; E04C 2/20; E04F 13/18
See application file for complete search history.

(56) References Cited

FOREIGN PATENT DOCUMENTS

| JP | H04101843 A | 4/1992 |
|----|-------------|--------|
| WO | 2001/018121 A1 | 3/2001 |
| WO | 2005/054340 A1 | 6/2005 |

OTHER PUBLICATIONS

PCT/AU2019/050474, International Search Report dated Aug. 2, 2019.
PCT/AU2019/050474, Written Opinion dated Aug. 2, 2019.
Notice of acceptance for patent application relating to Australian Application No. 2019273116, dated Sep. 17, 2020.
Examination Report No. 1, relating to Australian Application No. 2019273116, dated Jun. 19, 2020.

* cited by examiner

SECTION B-B

DETAIL A

THERMAL AND/OR FIRE RESISTANT PANEL, A MOUNTING ASSEMBLY, AND A KIT

CROSS-REFERENCE TO RELATED APPLICATIONS

This application is a US national phase application of international patent application No. PCT/AU2019/050474 filed on May 17, 2019, which claims priority to Australian patent application No. 2018901758 filed on May 19, 2018, the disclosures of each of which are fully incorporated herein by reference in their entireties.

FIELD OF THE INVENTION

The present technology relates generally to thermal and/or fire insulation material, thermal and/or fire resistant panels, insulation assemblies and kits for their assembly. Embodiments of the technology find particularly effective application in inhibiting heat and/or fire transfer in marine applications such as in seagoing ships and fast ferries but the technology is generally suitable for any building or land going or flying vehicle, wherein thermal and/or fire resistant panels, systems and assemblies are installed to inhibit heat transfer and/or fire transfer from one side of a partition, wall, deck or floor, to the other.

BACKGROUND OF THE INVENTION

Fires can be devastating in seagoing vessels or other vehicles, where, for one reason or another, people onboard cannot quickly or easily move to safety via egress or movement to some other area of the vehicle or vessel. Oftentimes in emergency situations there are multiple problems that simultaneously become of relevance, such as engine fire, galley fire, hull breach and structure buckling which inhibits operation of lifeboat davits and free passenger movement around the vessel through bulkheads and other areas. It is therefore important to delay, for as long as possible, the transfer of heat from one or more rooms in which a fire may have broken out, to other areas of the vehicle or vessel.

It is also useful for a seagoing vessel or other land-going or flying vehicle to have a light structure, so as to transport its cargo or passengers as efficiently as possible, and to keep it afloat for as long as possible in an emergency situation.

Known thermal and fire insulation materials come with a heavy weight penalty, in particular since they are installed with a high wrap factor. They are formed around the contours of the seagoing vessel or vehicle, including around strengthening and stiffening beams and channels.

There are several guidelines and standards with which designers of at least some parts of some types of seagoing vessels are required to at least consider or comply, including A60-class structural fire protection system; B15 Partitions and ceilings; H60-class structural fire protection systems; H120 Structural fire protection systems; N30 structural fire protection systems; SOLAS (Safety of Life at Sea); HSC Code (High Speed Craft); ISO fire standards; buildings fire standards; aviation fire standards; and FTP (Fire Test Procedure Code). As an example of a relevant consideration in at least one guideline or standard, the presence of high levels of organic compounds is undesirable or banned. In some other guidelines or standards it is prescribed that on one side of a barrier, when there has been present for one hour a heat of about 945 Celsius, the temperature reading averaged over five evenly-spaced thermocouples mounted on the other side should be less than 140 Celsius.

The present invention seeks to provide a new insulation material and/or thermal and/or fire resistant panel assembly and/or kit which seeks to ameliorate one or more of the above disadvantages or at least make a new alternative.

SUMMARY OF THE INVENTION

In a first aspect of the invention, there is provided a thermal and/or fire resistant panel comprising:
a panel body comprising a fire resistant composition, wherein the fire resistant composition comprises:
a silane cross-linked hybrid inorganic polymer; and
a siloxane.

In an embodiment, the panel body has at least one surface lined, treated, coated, or impregnated with the fire resistant composition.

In an embodiment, the silane cross linked hybrid inorganic polymer is of Formula I:

$$R_m[M_2O]_x[Al_2O_3]_y[SiO_2]_z X_q \cdot P H_2O \qquad \text{Formula I}$$

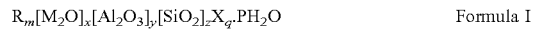

wherein R represents an organic functional group; M is an alkali metal; X is selected from chlorine and fluorine; m is $>0$; q is $\geq 0$; x is from 1 to 1.6; y is from 1.0; x/y is from 1.0 to 1.6; z is from 3 to 65; z/y is $\geq 1.0$; and P is from 3 to 5.

In one form of the above embodiment, M is an alkali metal selected from the group consisting of Na, K, Li, or mixtures thereof.

In one form of the above embodiment, the organic functional group R is a silane of the form $R^1_n SiO_{4-n}$, wherein $R^1$ represents an organic moiety and n is selected from 1, 2, or 3. Preferably, the silane is a glycidyl silane or an amino silane. More preferably, the silane is a glycidyl silane.

In an embodiment, a ratio of Al to alkali metal in the fire resistant composition is from about 4:13 to about 3:5 when measured as metakaolin and alkali metal silicate respectively.

In an embodiment, the composition comprises from about 20 wt % to about 30 wt % Al when measured as metakaolin.

In an embodiment, the composition comprises from about 50 wt % to about 65 wt % alkali metal when measured as alkali metal silicate.

In an embodiment, the composition comprises from about 1 wt % up to about 10 wt % silane cross-linking agent. Preferably, the composition comprises from about 2 wt % silane cross-linking agent. More preferably, the composition comprises from about 3 wt % silane cross-linking agent. Most preferably, the composition comprises from about 4 wt % silane cross-linking agent. Alternatively or additionally, it is preferred that the composition comprises up to about 9 wt % silane cross-linking agent. More preferably, the composition comprises up to about 8 wt % silane cross-linking agent. Most preferably, the composition comprises up to about 7 wt % silane cross-linking agent. In one example, the composition comprises 5 wt %±1 wt % silane cross-linking agent.

In an embodiment, the composition comprises from about 0.5 wt % to about 5 wt % siloxane. Preferably, the composition comprises from about 1.0 wt % siloxane. More preferably, the composition comprises from about 1.5 wt % siloxane. Most preferably, the composition comprises from about 2 wt % siloxane. Alternatively or additionally, it is preferred that the composition comprises up to about 4.5 wt % siloxane. More preferably, the composition comprises up to about 4.0 wt % siloxane. Most preferably, the composition comprises up to about 3.5 wt % siloxane. In one example, the composition comprises 2.5 wt %±0.5 wt % siloxane.

In an embodiment, the thermal and/or fire resistant panel is a panel of a refractory material. Preferably, the panel comprises, consists of, or consists essentially of one or more refractory materials. In one form of this embodiment, the thermal and/or fire resistant panel comprises less than 20 wt % organic matter. Preferably, the panel comprises less than 10 wt % organic matter. Most preferably, the panel contains substantially no organic matter and/or organic compounds. By substantially no organic matter and/or organic compounds it is meant less than 2 wt %, preferably less than 1 wt %, and most preferably less than 0.5 wt %. In still further forms of this embodiment, the thermal and/or fire resistant panel does not include wood.

In an embodiment, the panel body is laminated with a layer of a woven material comprising the fire resistant composition. Preferably, the layer of the woven material is selected from the group consisting of: glass fibre, carbon cloth, basalt cloth and steel mesh.

In an embodiment thermal and/or fire resistant panel is in the form of a board. In alternative embodiments the thermal insulation panel is a fibre blanket. In these alternative embodiments the fibre blankets may be reinforced with battens or other strengthening supports on the surface or within the blanket itself to provide a panel-like thermal insulating element.

In an embodiment, a thermal and/or fire resistant panel is lined with or is impregnated with an acoustic attenuation material. In forms of this embodiment, the acoustic attenuation material is in the form of a contoured surface on one side, or a heavy layer sandwiched within the thermal and/or fire resistant panel. Preferably, the heavy layer is flexible and/or mounted in a foam such as an intumescent foam, or the like. More preferably, the acoustic attenuation material is the foam.

In an embodiment the dimensions of the thermal and/or fire resistant panel are stable under the effects of heat in the range of 0 to 1100° C. However, it will be appreciated that the thermal and/or fire resistant panel may be dimensionally heat stable under higher temperatures.

In an embodiment, the panel body is a thermal insulating blank, such as a blank of refractory material. In one form of this embodiment, the blank is a compressed fibre board of refractory fibres. It is preferred that the blank of refractory material comprises: refractories and/or fibres and/or amorphous alkaline-earth-silicates 0.1-90 wt %; Perlite 0.1-20 wt %, colloidal silica 0.1-20 wt %, and starch 0.1-20%.

Other thermal insulating blank compositions are contemplated, including mixtures in various proportions of polycrystalline wools, amorphous silica, water and polyacrylamide.

In forms of the above embodiment, the thermal insulating blank has a thermal conductivity value of less than 0.3 W/m·K at temperatures at 1000° C. or less.

In an embodiment, the fire resistant panel further comprises a layer of a composite material including any one or more of the group consisting of: woven mat, non-woven mat, fibres, felt and fabric. Preferably the layer of composite material comprises the fire resistant composition.

In an embodiment, the fire resistant panel further comprises a vapour barrier layer on at least one or more faces of the panel body. It is preferred that the vapour barrier layer is selected from the group consisting of aluminium foil, paint, or Venture Tape (a product of the 3M company).

In an embodiment the fire resistant panel has dimensions of up to about 1200 mm×up to about 2400 mm×up to about 25 mm. Other dimensions are contemplated. However, this panel size is useful for managing the stresses likely to be experienced by the fire resistant panel.

In a second aspect of the invention, there is provided a method of preparing a fire resistant panel comprising (such as the fire resistant panel according to the first aspect of the invention and embodiments thereof):
  applying a resin of a fire resistant composition to a surface of a panel body; and
  curing the resin to form a fire resistant panel including a fire resistant composition comprising:
  a silane cross-linked hybrid inorganic polymer; and
  a siloxane.

In an embodiment, the resin comprises:
  a hybrid inorganic polymer;
  a silane;
  a siloxane.

In an embodiment, the resin further comprises an alkali metal silicate.

In an embodiment, the silane cross linked hybrid inorganic polymer is of Formula I. Preferably, M is an alkali metal selected from the group consisting of such sodium, potassium, lithium, or mixtures thereof.

In one form of the above embodiment, the organic functional group R is a silane of the form $R^1{}_n SiO_{4-n}$, wherein $R^1$ represents an organic moiety and n is selected from 1, 2, or 3. Preferably, the silane is a glycidyl silane or an amino silane. More preferably, the silane is a glycidyl silane.

In an embodiment, a ratio of Al to alkali metal in the resin and/or fire resistant composition is from about 4:13 to about 3:5 when measured as metakaolin and alkali metal silicate respectively.

In an embodiment, the resin and/or fire resistant composition comprises from about 20 wt % to about 30 wt % Al when measured as metakaolin.

In an embodiment, the resin and/or fire resistant composition comprises from about 50 wt % to about 65 wt % alkali metal when measured as alkali metal silicate.

In an embodiment, the resin and/or fire resistant composition comprises from about 1 wt % up to about 10 wt % silane cross-linking agent. Preferably, the resin and/or fire resistant composition comprises from about 2 wt % silane cross-linking agent. More preferably, the resin and/or fire resistant composition comprises from about 3 wt % silane cross-linking agent. Most preferably, the resin and/or fire resistant composition comprises from about 4 wt % silane cross-linking agent. Alternatively or additionally, it is preferred that the resin and/or fire resistant composition comprises up to about 9 wt % silane cross-linking agent. More preferably, the resin and/or fire resistant composition comprises up to about 8 wt % silane cross-linking agent. Most preferably, the resin and/or fire resistant composition comprises up to about 7 wt % silane cross-linking agent. In one example, the composition resin and/or fire resistant composition 5 wt %+1 wt % silane cross-linking agent.

In an embodiment, the resin and/or fire resistant composition comprises from about 0.5 wt % to about 5 wt % siloxane. Preferably, the resin and/or fire resistant composition comprises from about 1.0 wt % siloxane. More preferably, the resin and/or fire resistant composition comprises from about 1.5 wt % siloxane. Most preferably, the resin and/or fire resistant composition comprises from about 2 wt % siloxane. Alternatively or additionally, it is preferred that the resin and/or fire resistant composition comprises up to about 4.5 wt % siloxane. More preferably, the resin and/or fire resistant composition comprises up to about 4.0 wt % siloxane. Most preferably, the resin and/or fire resistant composition comprises up to about 3.5 wt % siloxane. In one example, the resin and/or fire resistant composition comprises 2.5 wt %±0.5 wt % siloxane.

In an embodiment, the thermal and/or fire resistant panel is a panel of a refractory material. Preferably, the panel comprises, consists of, or consists essentially of one or more refractory materials. In one form of this embodiment, the thermal and/or fire resistant panel comprises less than 20 wt % organic matter (i.e. substantially inorganic). Preferably, the panel comprises less than 10 wt % organic matter. Most preferably, the panel contains substantially no organic matter and/or organic compounds. By substantially no organic matter and/or organic compounds it is meant less than 2 wt %, preferably less than 1 wt %, and most preferably less than 0.5 wt %. In still further forms of this embodiment, the thermal and/or fire resistant panel does not include wood.

In a third aspect of the invention, there is provided the use of a resin in the preparation of a fire resistant panel (such as the fire resistant panel according to the first aspect of the invention and embodiments thereof, or a fire resistant panel produced according to the method of the second aspect of the invention and embodiments thereof).

In a fourth aspect of the invention, there is provided a kit for installing a thermal and/or fire insulation panel assembly on a wall or mounting surface, the kit comprising:
  one or more thermal and/or fire resistant panels according to the first aspect of the invention or embodiments thereof, or produced according to the method of the third aspect of the invention;
  a locating frame for receiving the thermal and/or fire resistant panels; and
  one or more thermal and/or fire insulation panel retainers configured to fasten to or otherwise mount onto the locating frame.

In a fifth aspect of the invention, there is provided a thermal and/or fire resistant panel assembly comprising;
  one or more thermal and/or fire resistant panels according to the first aspect of the invention or embodiments thereof, or produced according to the method of the third aspect of the invention;
  a locating frame configured to be mounted on a wall or other surface, the locating frame receiving at least portions of the one or more thermal and/or fire insulation panels thereon; and
  one or more panel retainers fastened to or otherwise mounted on the locating frame.

In an embodiment of the fourth or fifth aspects, the locating frame comprises a plurality of panel locating elements for locating at least a portion of the thermal and/or fire resistant panel(s).

In an embodiment of the fourth or fifth aspects, the locating frame includes a plurality of frame elements, each including one or more panel locating elements.

In one form of this embodiment, each of the plurality of panel locating elements is in the form of edge locating elements for receiving at least a portion of an edge of the thermal and/or fire insulating panels relative to the locating frame and other adjacent thermal insulating panels.

In one form of this embodiment, each of the panel locating elements comprises a recess for receiving a portion of a panel. Preferably, the recess is in the form of a shoulder against which a portion of the panel may abut in use. More preferably, two shoulders are provided, spaced-apart from one another, on opposite sides of an elongate frame element, to provide symmetry to facilitate ease of assembly. Most preferably, a landing is provided between the shoulders so as to facilitate mounting of a retainer thereon. It is still further preferred that the elongate frame element is a top-hat-on-a-top-hat section, the section being formed by being rolled or press-braked. In one embodiment the section is 0.45 mm thick stainless steel, for longevity in a marine environment, the spaces provided under the hats for thermal and/or fire insulation. Advantageously there is a small contact patch relative to the stand-off, so that thermal conductivity by conduction is reduced to the mounting surface.

The top-hat-on-a-top-hat section in some embodiments provides rigidity for support of panels but also a small contact patch with the mounting surface (or the mounting spacers in some embodiments), to reduce thermal transmission by conduction and to a lesser extent, radiation, from the shoulder of the frame elements to the mounting surface.

In one form of this embodiment, the one or more frame elements comprises an integral mounting spacer for spacing the thermal and/or fire insulating panel from the wall and/or ceiling on which the frame element is mounted. Preferably, the integral spacer is in the form of a plinth. More preferably, the plinth is in the form of a top-hat channel section so as to be integral with the frame element. Still more preferably, in forms in which the recess is in the form of a shoulder against which a portion of the panel may abut in use, the shoulder is mounted on the plinth and is integral therewith so as to provide a vapour seal.

In one form of this embodiment, the frame elements are elongate channel sections. Preferably, the frame elements are straight. However, arcuate or suitably contoured frame elements are contemplated depending on the application.

In various forms of the invention, there is provided a joiner which joins a plurality of elongate frame elements. The joiner may include recesses for receiving the ends of the elongate frame elements. The joiner may be a cruciform with four orthogonal recesses to receive four frame ends. Preferably, a gasket/seal is provided at edges or vertices of the frame elements to inhibit thermal leakage or smoke leakage through the assembly. The gasket/seal is configured to be mounted on the panel faces and may be fastened thereon by at least one retainer. Preferably, the gasket/seal and/or retainer fasten to the joiner to facilitate the seal.

In various forms, the gasket/seal is formed from an intumescent panel constructed of organic thermal insulation material. In one embodiment the seal is a disc of intumescent material of about 140 mm in diameter. The gasket may be impregnated paper.

In one embodiment of the fourth or fifth aspects, there is provided a seal which includes a disc of silica fibres.

In embodiments including one or more retainers, it is preferred that the retainers fasten or otherwise inter-engage with a respective frame element.

In embodiments including one or more retainers, it is preferred that the one or more of the retainers are in the form of a disc retainer configured to retain the gasket seal onto one or more of the frame elements. The disc retainer preferably retains the panel directly by being mounted abutting thereagainst, and fastened to a frame element.

In embodiments including one or more retainers, it is preferred that the one or more of the retainers are in the form of an elongate strip which abuts the panels along the edge and extends along the frame element and is fastened or otherwise interrogated therewith.

In embodiments including a shoulder, it is preferred that the shoulder on the edge frame element is not as thick as the panel. This facilitates good thermal insulation when the strip retainer is mounted on the panels, since the gasket and/or strip retainer mounts on the panels rather than the top hat of the section. The gasket and/or strip retainer forms a gasket seal on the panel, forming a good vapour/smoke barrier.

The edge location and mounting of the panels reduces thermal transmission by conduction and provides additional strength to the panel, particularly when suspended from a ceiling. In selected embodiments the edges of the insulating panels are clamped between the strip retainers and the edge frame elements, the retainers and frame elements only touching via fasteners along the frame elements, which provides rigidity to the panel without thermal transmission by conduction.

In various embodiments of the fourth or fifth aspects, mounting spacers are provided to further insulate the mounting wall or surface. Preferably, the mounting spacers may be mounting blocks for receiving and mounting the elongate frame elements. More preferably, the mounting spacers are suspension hangers to suspend the elongate frame elements from an underside of a mounting surface or deck.

In various embodiments there is provided a tray in which the thermal and/or fire resistant panel is mounted for additional support. The tray may be a sheet of stainless steel. The tray may include small flanges to retain the panel. The flanges may be 17 mm high, for supporting a thicker panel, which may be up to 50 mm thick. In one embodiment the tray or sheet of stainless steel may be about 0.45 mm thick.

In various embodiments the panels may be supported on their periphery by channels. The channels may be of stainless steel. The channels may be C-shaped. The channels may be filled with thermal and/or fire insulating material acting when assembled against the panel, as a gasket.

In various embodiments, the panel assembly may include an intermediate layer of insulating material. The intermediate layer may be aluminium foil. For example, there may be mounted on one side of a 25 mm panel body, a layer of aluminium foil, and another 35 mm panel body may be disposed on the foil side of the 25 mm panel body.

In various embodiments, there is loose fill or a blanket or a board which fills a wall-mounted channel and mounting spacers, between the thermal and/or fire resistant panel and the supporting wall structure. There may be provided a framework or grid or mesh to hold the loose fill or flexible or rigid panels to the wall or supporting structure. The fill may be intumescent.

DETAILED DESCRIPTION OF THE EMBODIMENTS

Figure 1:
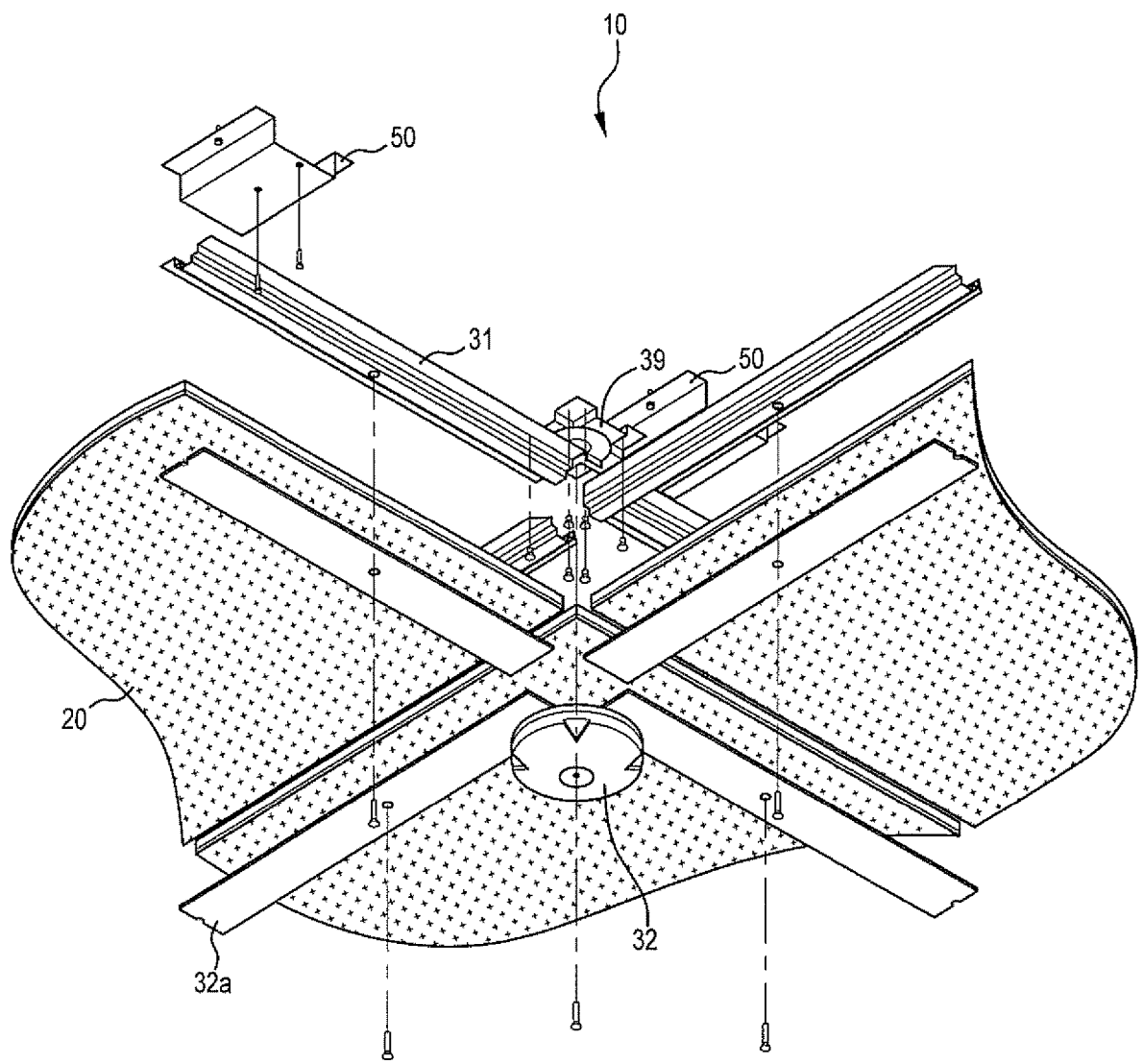
FIG. 1 is an isometric view of a general exploded arrangement of an embodiment of the present technology mounted on a vertical wall, showing composite panel, peripheral frame elements, strip retainers, joiner, disc seal cover plate, and mounting spacer.

The present invention relates to a thermal and/or fire resistant panel that comprises a panel component that has been treated with a fire resistant composition. The fire resistant composition comprises a hybrid inorganic polymer (HIP).

In brief, a HIP is an inorganic polymer (such as an aluminosilicate polymer typically derived from the polycondensation of aluminosilicates and alkaline solutions) that has been modified to incorporate within their structure organic groups. The HIP system was developed by CSIRO and is disclosed in U.S. Pat. No. 7,771,686 (the entire disclosure of U.S. Pat. No. 7,771,686 is hereby incorporated herein by reference). This earlier US patent also suggests that HIP resins may impart enhanced fire and flame resistance when applied to timber. The inventors of U.S. Pat. No. 7,771,686 suggest that this is because during combustion of wood, wood releases volatile and combustible substances. However, when wood is coated with a HIP, the release of these volatile and combustible substances is inhibited and as a result flame propagation is reduced.

The inventors have found that a composition containing HIP is also useful to impart fire resistance to marine panels. Typically, the marine panels considered in the context of this invention are those formed from refractory materials rather other than wood.

Compositions of a selection of commercially available marine panels are provided below:

Marine Board (eg FyreWrap Marine Board LW), manufactured by Unifrax, has the following composition: amorphous alkaline-earth-silicates 60-65 wt %, perlite 10-15%, colloidal silica 10-15%, starch 3-10%.

DONACARBO RIGID INSULATION (eg DON-1000, DON-2000, DON-3000, DON-4000—preferably DON-1000), manufactured by OSAKA GAS Chemicals Co., Ltd., has the following composition: carbon fibre 90-99.9% and carbonized thermosetting resin 0.1-10%.

Superwool Plus Board (eg Board 75, H Board, Board 85, Board LTI, Board INO), manufactured by Thermal Ceramics, has the following composition: refractory Alkaline-earth Silicate Ceramic fibres, silica 1-82%, calcia and magnesia 0.1-43%, alumina, titania, and zirconia 0.1-6%.

Silplate Board (eg Fibrerfrax, Silplate 1308 Structural Insulating Board), manufactured by UniFrax, has the following composition: aluminosilicate (refractory ceramic fibres) 90% by weight, and silica (amorphous) 10% by weight.

Silplate 1212S (eg Fibrefrax, Silplate 1212S Structural insulating boards), manufactured by UniFrax, which has the following composition: Ca—Mg-silicate fibre 0.1-99%, silica (amorphous) 0.1-80%, starch 0.1-40%.

FibreFrax Duraboard (eg FibreFrax Duraboard products 350ES, 500ES, HD Insulation, LD insulation, RG Insulation, manufactured by UniFrax, which comprises aluminosilicate (refractory ceramic fibres), calcined kaolin clay, silica (amorphous), and starch.

Other FibreFrax, manufactured by UniFrax and including a combination of: water, silica (amorphous), aluminosilicate (refractory ceramic fibre), ethylene glycol and polyethylene oxide.

Thermfrax products (eg Gemcolite ASM FG-165050, Gemcolite LD and HD and Gemcolite NS), manufactured by Unifrax as refractory ceramic fibre alumina-silica boards.

The inventors have found that although HIP is useful for improving the fire resistance of such panels (e.g. refractory panels); it has a number of shortcomings that prevents adoption, particularly in a marine setting. To address this, the inventors have developed a panel that has a panel body having at least one surface lined, treated, coated, or impregnated with a fire resistant composition comprising: a silane cross-linked hybrid inorganic polymer; and a siloxane. The presence of the silane and the siloxane are important for enhancing the adhesion of the composition to the panel body and provide improved water resistance. Both of these factors are particularly important in environments where the panel is exposed to water and/or humidity (e.g. such as in a marine environment).

The invention will now be described below in relation to a preferred embodiment.

Turning to FIGS. 1 to 6, there is illustrated a thermal and/or fire resistant panel assembly generally indicated at 10 which includes one or more thermal and/or fire resistant panels according to a first aspect of the invention being insulation panels 20 (which panels 20 are approximately 1200 mm×2400 mm×20 mm), a locating frame or supporting structure assembly 30, corner support brackets 39, and coverstrips 32 a configured to be mounted on a wall or other surface. In one embodiment, the locating frame may be made out of frame elements 31 being channel work.

The locating frame 30 is configured to locate at least portions of the one or more thermal insulation panels 20, and the panel retainers 32 are fastened to or otherwise mounted to the channel work 31 for retaining the insulation panels 20 on the locating frame 30.

In this embodiment, the insulation panel 20 includes a refractory panel body 22 that has been treated with a fire resistant composition that comprises a silane cross-linked hybrid inorganic polymer and a siloxane.

The locating frame 30 includes a plurality of frame elements 31 which include a number of artefacts such as panel edge locating 33 for locating at least an edge portion of the insulation panels 20.

The frame element 31 includes a recess 34 for receiving an edge portion of a panel, which is in the form of a shoulder 35 against which an edge portion of the insulation panel 20 may abut in use. The one or more frame elements 31 includes an integral mounting space 36 for spacing the insulation panel 20 from the wall on which the panel assembly 10 is mounted. The integral space 36 is created by the top-hat shape 37 of frame element 31 (see FIG. 3).

There is a landing 38 between two spaced-apart shoulders 35 so as to facilitate fastening of a retainer 32 thereon. The frame element 31 is a top-hat-on-a-top-hat section, the section being formed by being rolled or press-braked. The top hat shape section 37 (as with the elongate retainers described herein) is 0.45 mm thick stainless steel, for longevity in a marine environment, with space provided under the hats for rivet nuts, screws and hanging rods.

There is provided a joiner 39 (see FIG. 2) which joins a plurality of elongate frame elements 31. The joiner 39 includes recesses for receiving the ends of the elongate frame elements 31. The joiner is a cruciform with four orthogonal recesses to receive four frame ends.

A gasket seal 41 (see FIG. 3) is provided at edges or vertices of the frame elements 31 to retain the panels 20 and to inhibit thermal leakage through the assembly. The gasket seal 41 is configured to be mounted on the panel faces and may be fastened thereon by each retainer 32. The gasket seal 41 is a disc or plate or elongate shape, or other shape, and may be formed as a panel of the present invention.

The retainer 32 fastens to the joiner 39 on the opposite side of the panels to facilitate a sealing contact. The gasket seal 41 is a disc of insulation material of about 150 mm in diameter.

More than one kind of retainer 32 is provided, and they fasten or otherwise inter-engage with a respective frame element 31. One kind of retainer 32 is a disc configured to retain the seal 41 onto one or more of the frame elements 31. The disc retainer 32 retains the panel 20 directly by being mounted abutting thereagainst, and fastened to joiner 39 via a screw. Another kind of retainer is an elongate strip 32a (FIG. 3) which abuts the panels along the edge and extends along the frame element 31 and is fastened or otherwise inter-engaged therewith to reduce thermal conductive contact.

Figure 3:
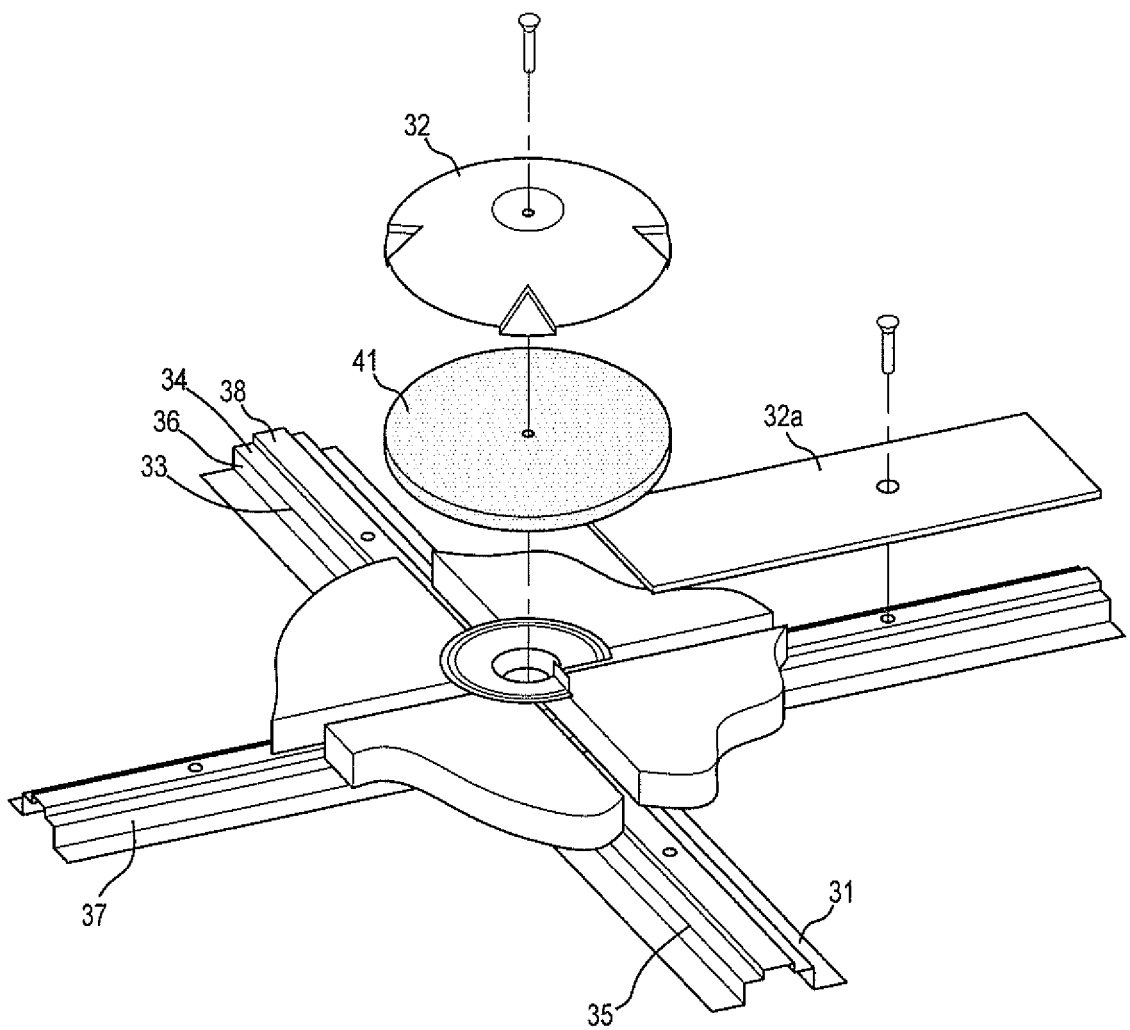
FIG. 3 is an exploded view of a vertex arrangement similar to those shown in FIGS. 1 and 2, but the vertex seal plate includes an intumescent disc underneath it.
Figure 4:
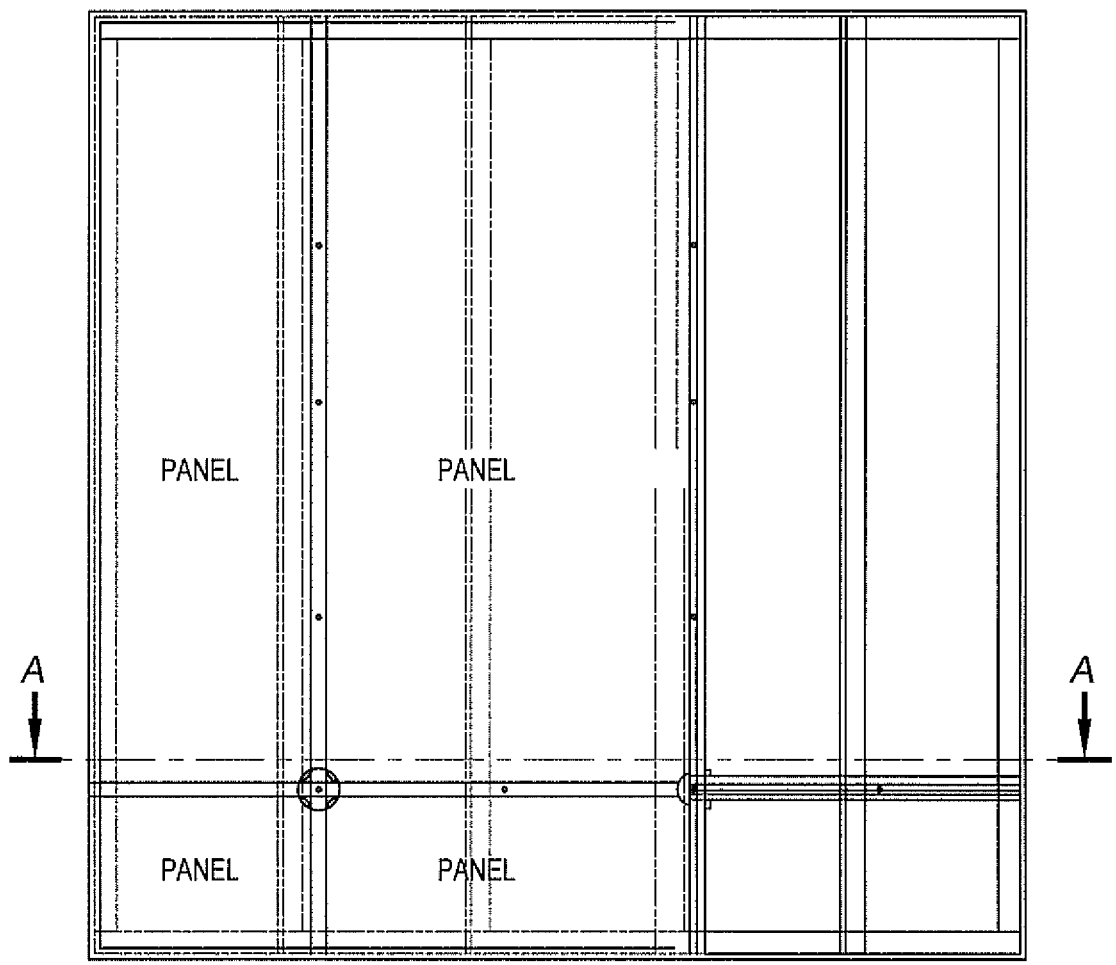
FIG. 4 is a plan view from underneath of a ceiling-mounted suspension arrangement, shown in part in FIG. 6.
Figure 5:
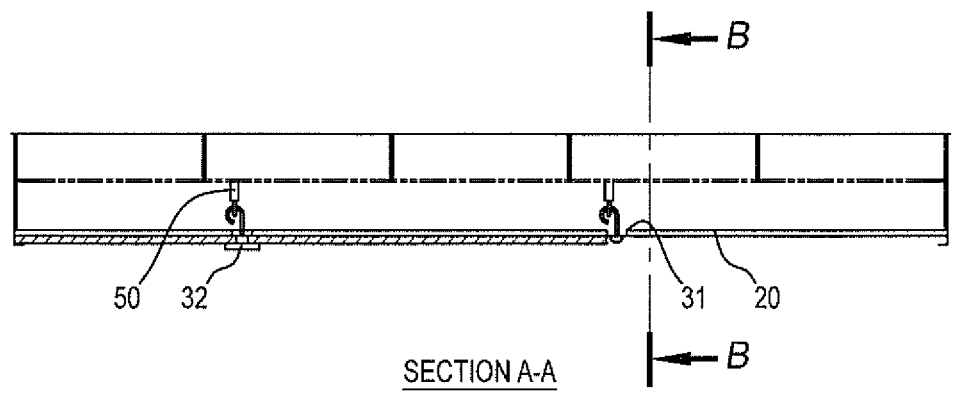
FIG. 5 is a section view through A-A shown in FIG. 4 and also shown below that is a section view of a wall-mounted panel arrangement of a preferred embodiment.
Figure 5:
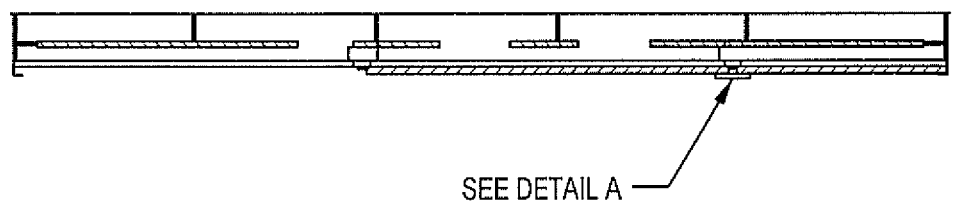
Figure 6:
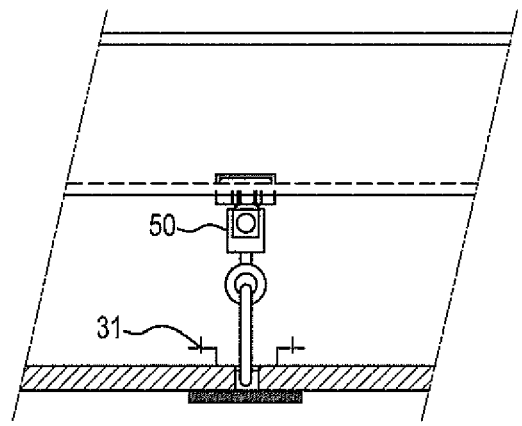
FIG. 6 is a cross-section view (through B-B of FIG. 5) of a suspended arrangement of the present technology and detail A is a detail of the second drawing in FIG. 5, being a wall-mounted panel version of the suspended panel arrangement shown in FIG. 4.
Figure 6:
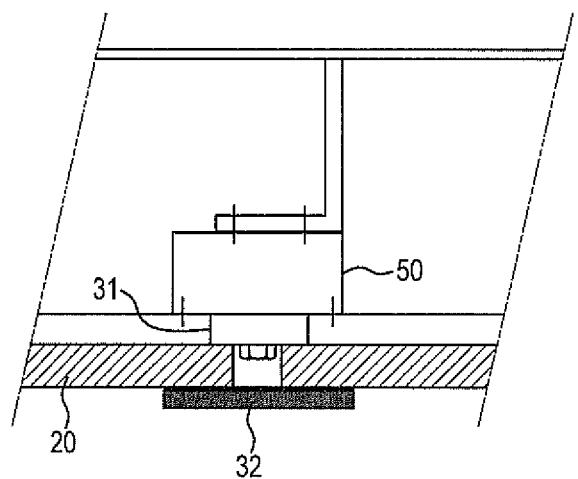

It can be seen in FIG. 3 that the shoulder 35 on the frame element 31 is not as high as the panel is thick. This facilitates good thermal insulation when the strip retainer 32a is mounted on the panels 20. Having the shoulder 35 lower than the panel height provides a good thermal seal against which the strip retainers 32a and disc retainers 32 can abut, increasing thermal insulation performance since the only thermal conduction is via the fasteners/screws.

The frame element 31 is mounted on a top hat section being a mounting spacer 50, or alternatively hung from hanging assembly section 50, and may be integral therewith so as to provide a vapour seal and to reduce manufacturing costs in production.

Further mounting spacers 50 can be provided to provide further space to further insulate the mounting wall or surface. The further mounting spacers shown in FIG. 1 are mounting blocks in the form of short, square top hats for receiving and mounting the elongate frame elements 31. They are short to reduce thermal conduction contact with the mounting surface.

Figure 2:
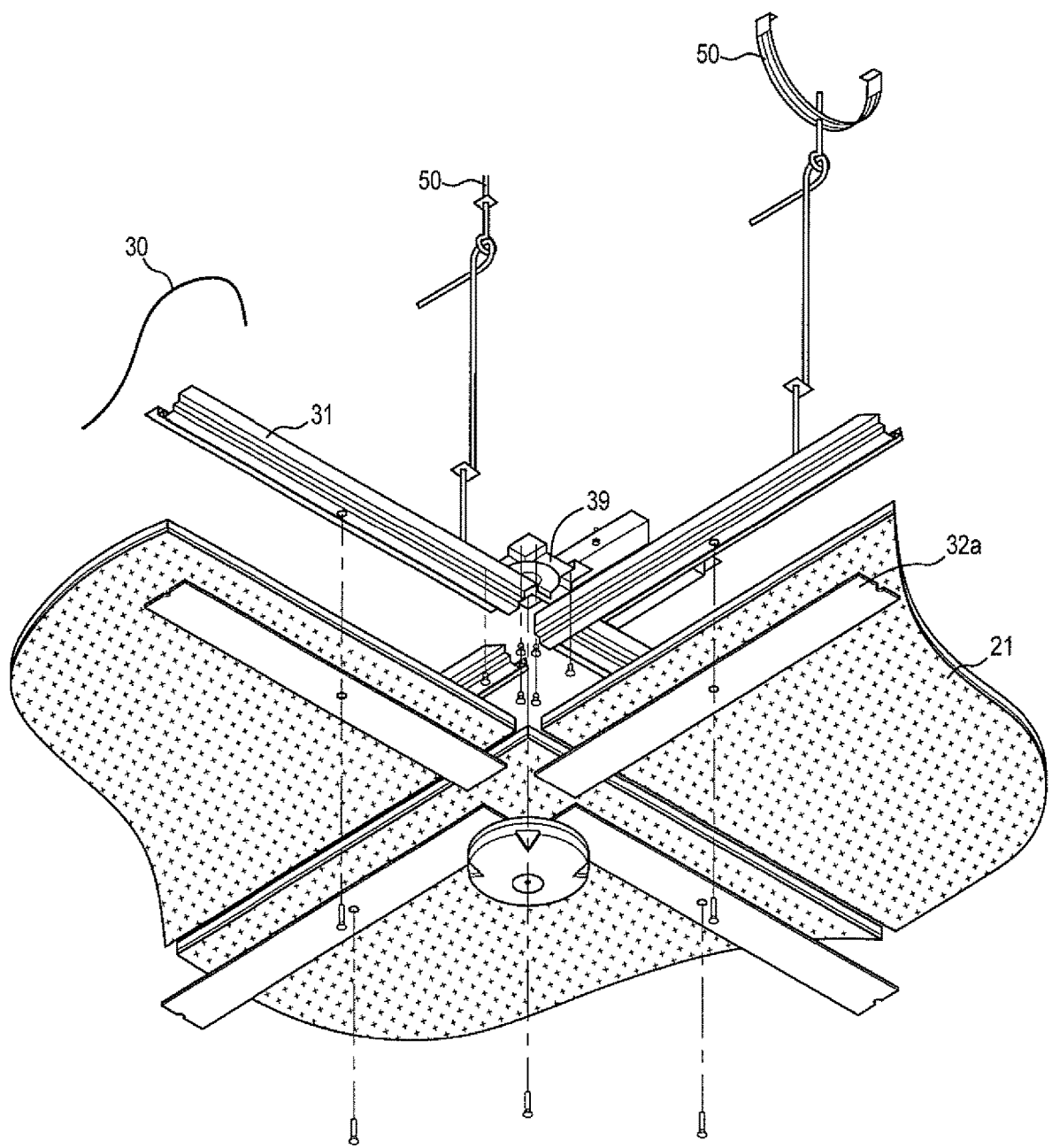
FIG. 2 is a similar view to that shown in FIG. 1, but the embodiment is suspended from a ceiling or underside of a deck, and therefore there is shown a mounting spacer in the form of suspension elements.

Further mounting spacers 50 in one form shown in FIG. 2, are suspension hangers to suspend the elongate frame elements 31 from an underside of a mounting surface or deck. It can be seen that the edge frame elements 31 are not mounted to the deck; they are mounted to the suspension elements to reduce thermal transmission by conduction.

The panellised nature of embodiments of the technology and their edge mounts means that if a panel is damaged or needs upgrading or maintenance, it is a simple matter of removing the fasteners holding the retainers clamping the edges, and removing the panel. Known blanket insulation, mechanically fastened as it is to the contours of the vessel, is ruined by its removal and maintenance, and the surface is more difficult to mount fresh blankets.

Figure 7:
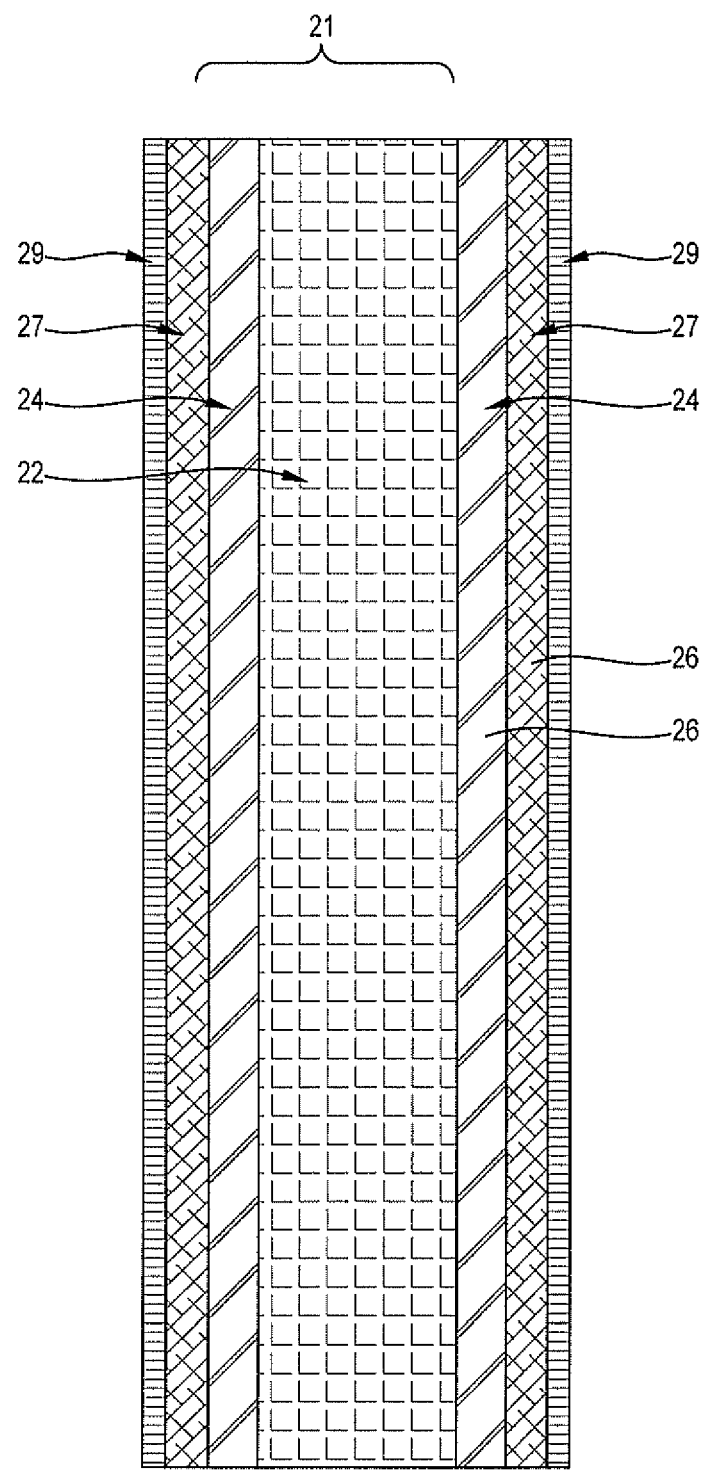
FIG. 7 is a section view of a panel of one embodiment of the present technology.
Figure 8:
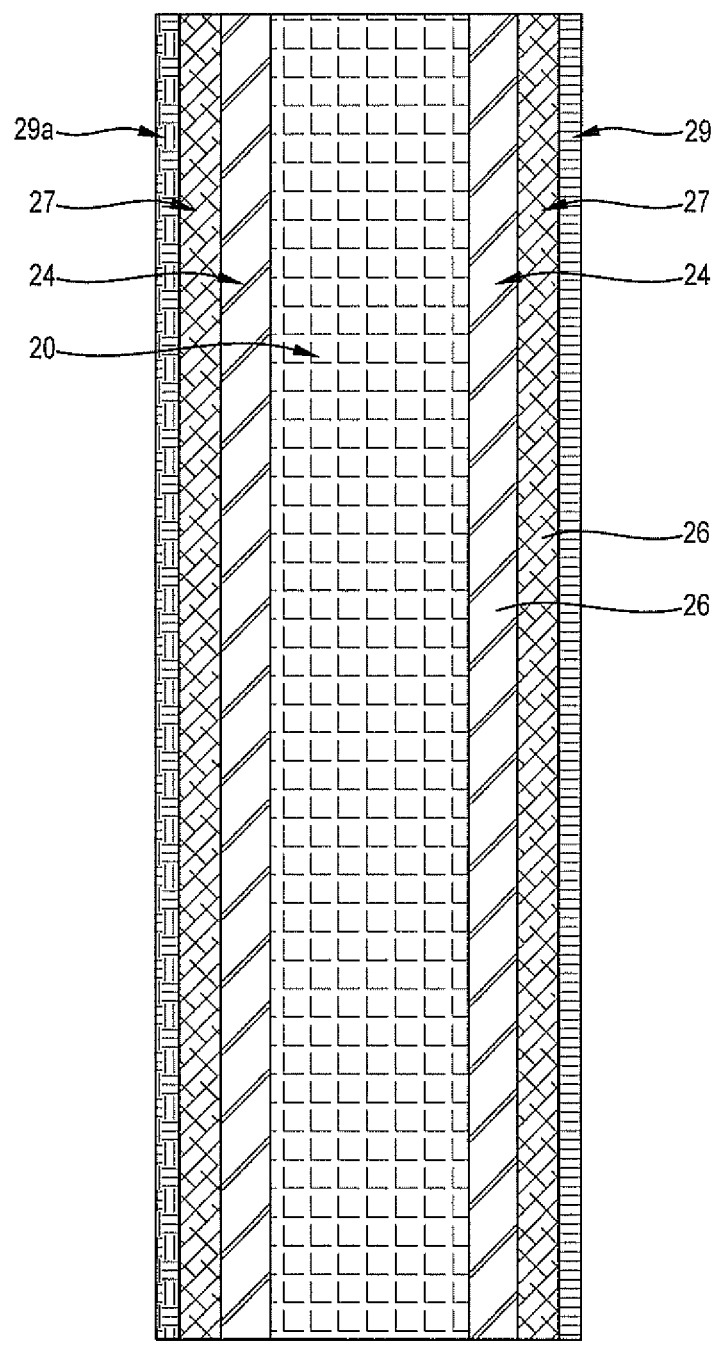
FIG. 8 is a section view of a panel of another embodiment of the present technology.
Figure 9:
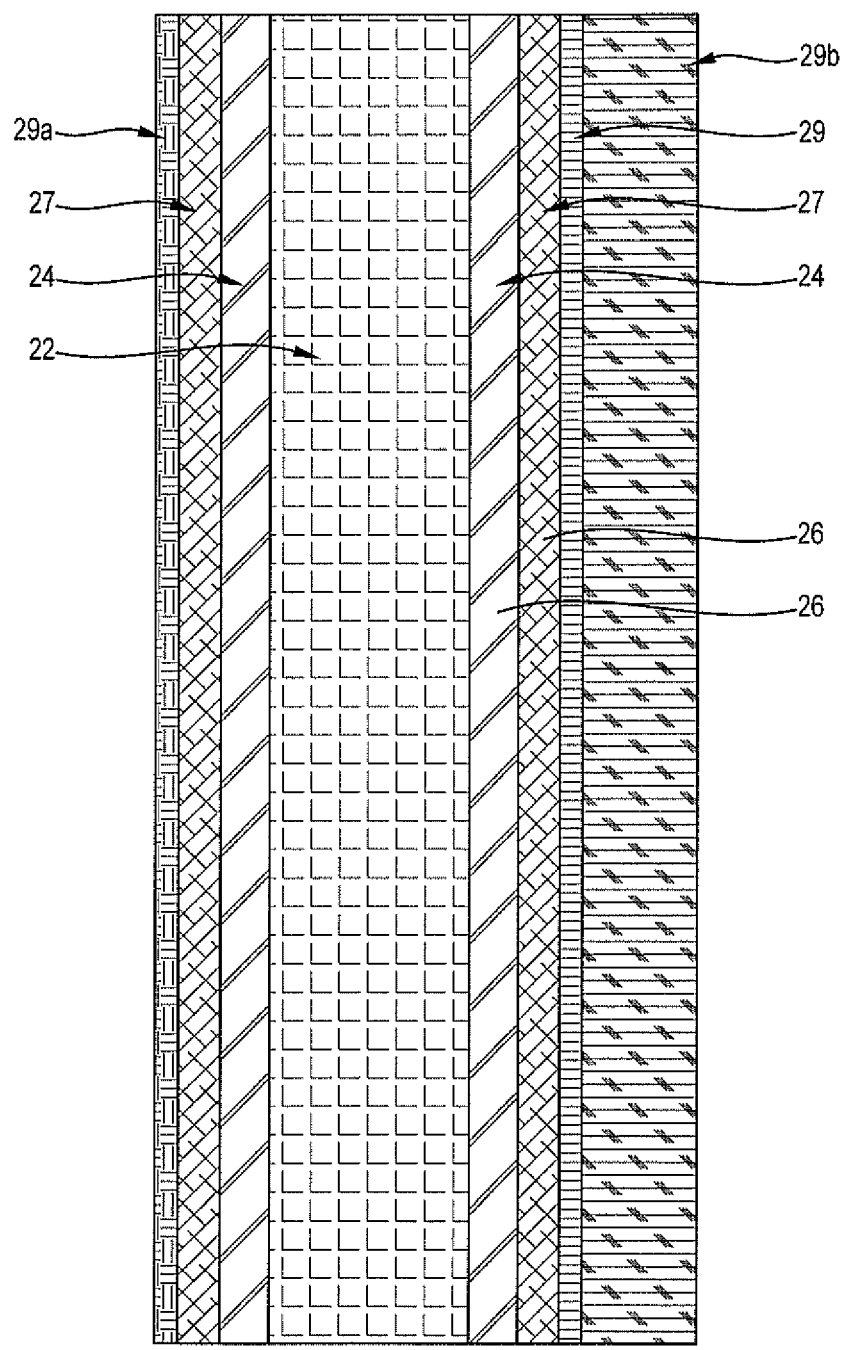
FIG. 9 is a section view of a composite panel of another embodiment of the present technology.
Figure 10:
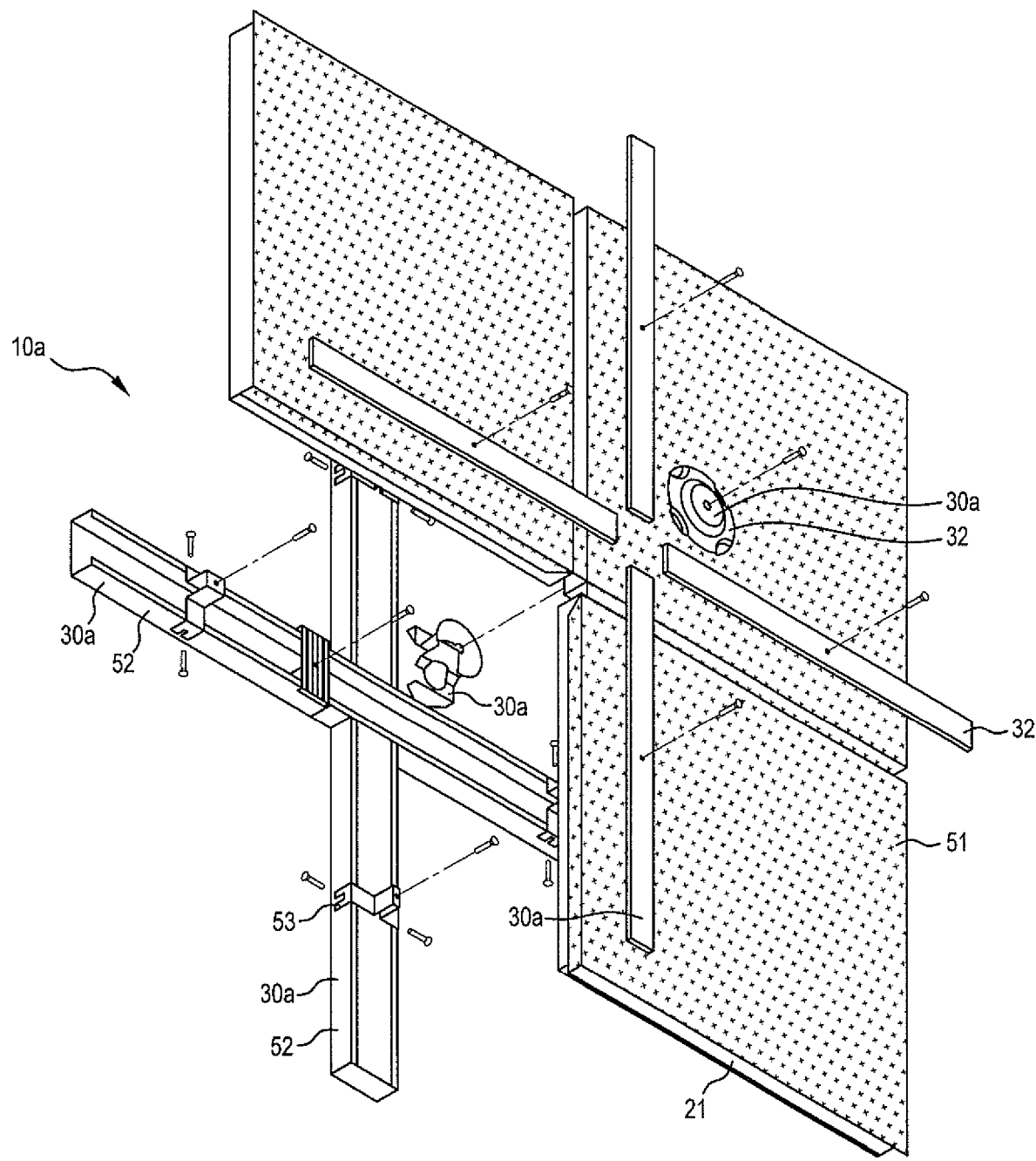
FIG. 10 is an isometric view of a general exploded arrangement of another embodiment of the present technology mounted on a vertical wall, showing composite panel, peripheral frame elements, strip retainers, joiner; disc seal cover plate; and mounting spacer.
Figure 11:
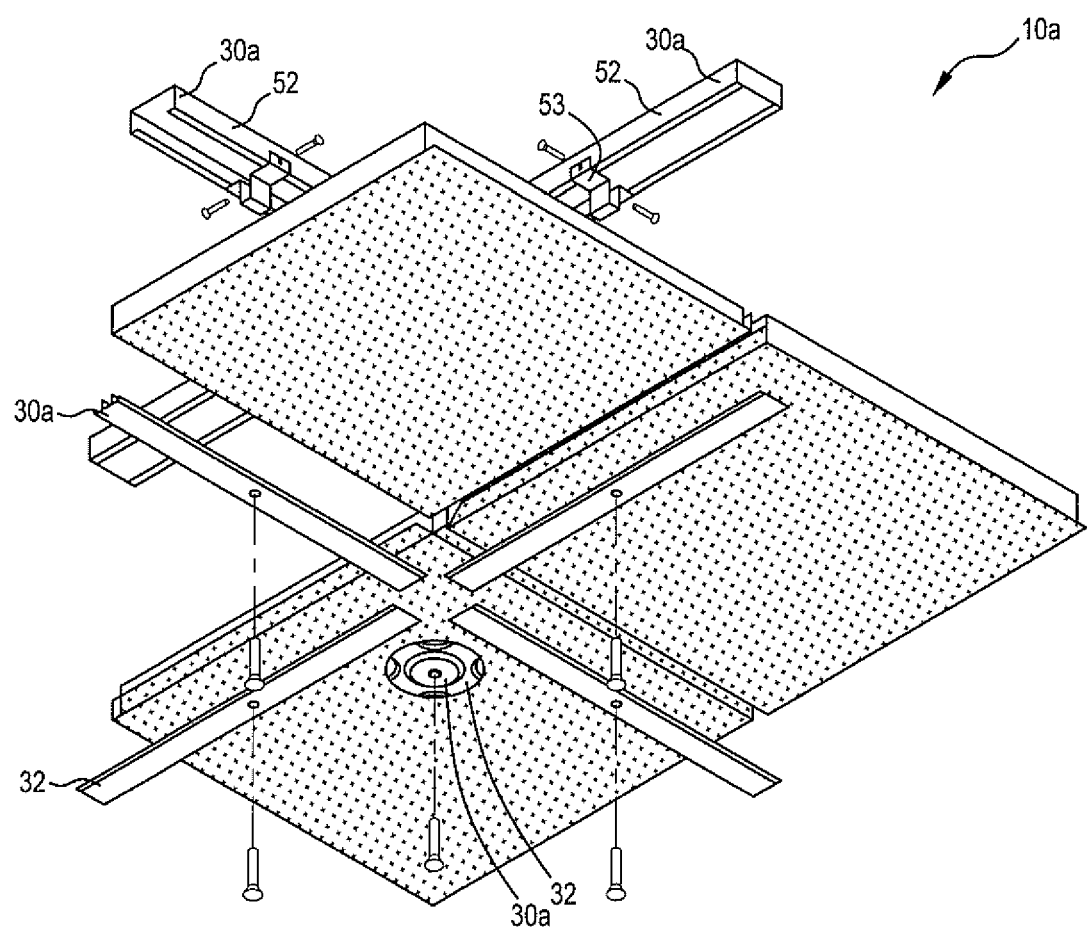
FIG. 11 is a similar view to that shown in FIG. 10, but the embodiment is suspended from a ceiling or underside of a deck, and therefore there is shown a mounting spacer in the form of suspension elements.
Figure 12:
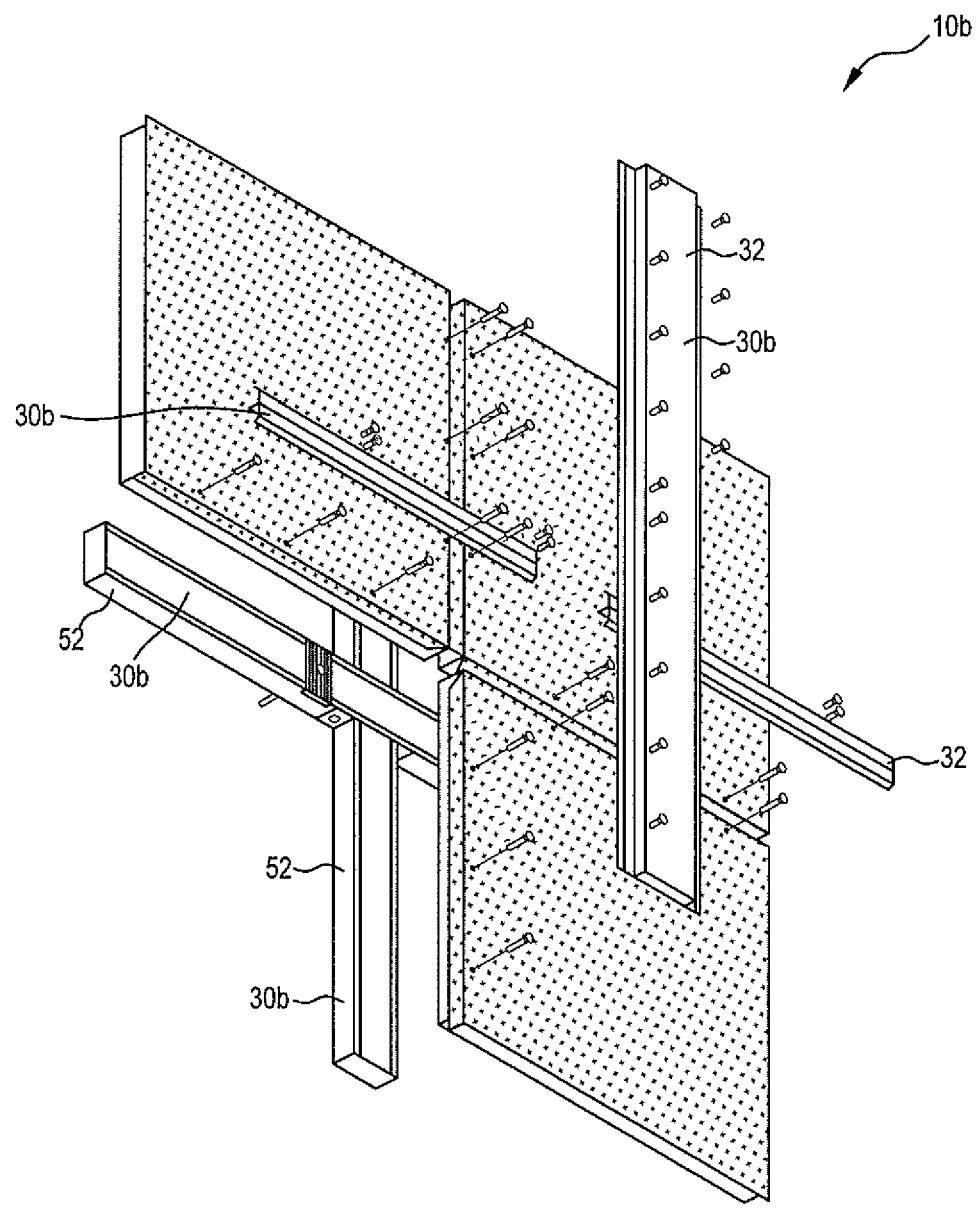
FIG. 12 is an isometric view of a general exploded arrangement of another embodiment of the present technology mounted on a vertical wall, showing composite panel, peripheral frame elements, strip retainers, joiner, disc seal cover plate, and mounting spacer.
Figure 13:
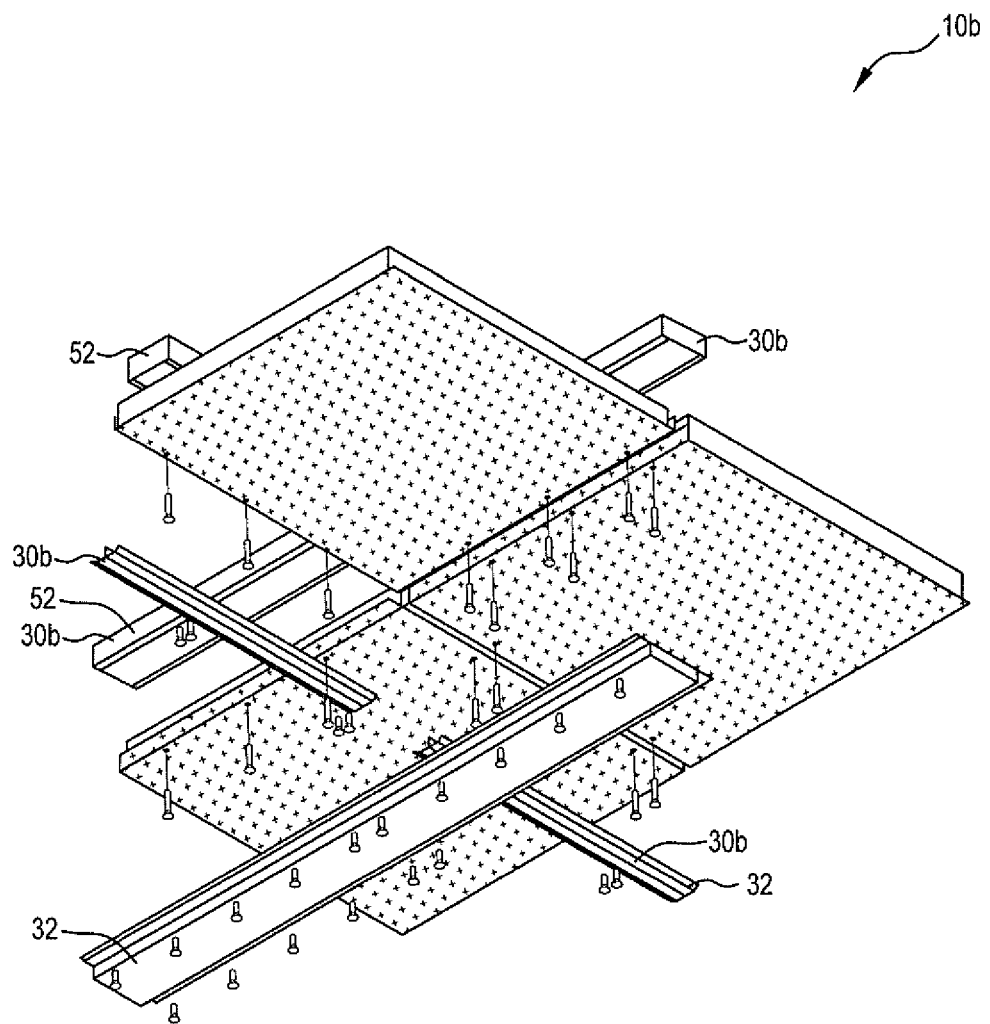
FIG. 13 is a similar view to that shown in FIG. 12, but the embodiment is suspended from a ceiling or underside of a deck, and therefore there is shown a mounting spacer in the form of suspension elements.
Figure 14:
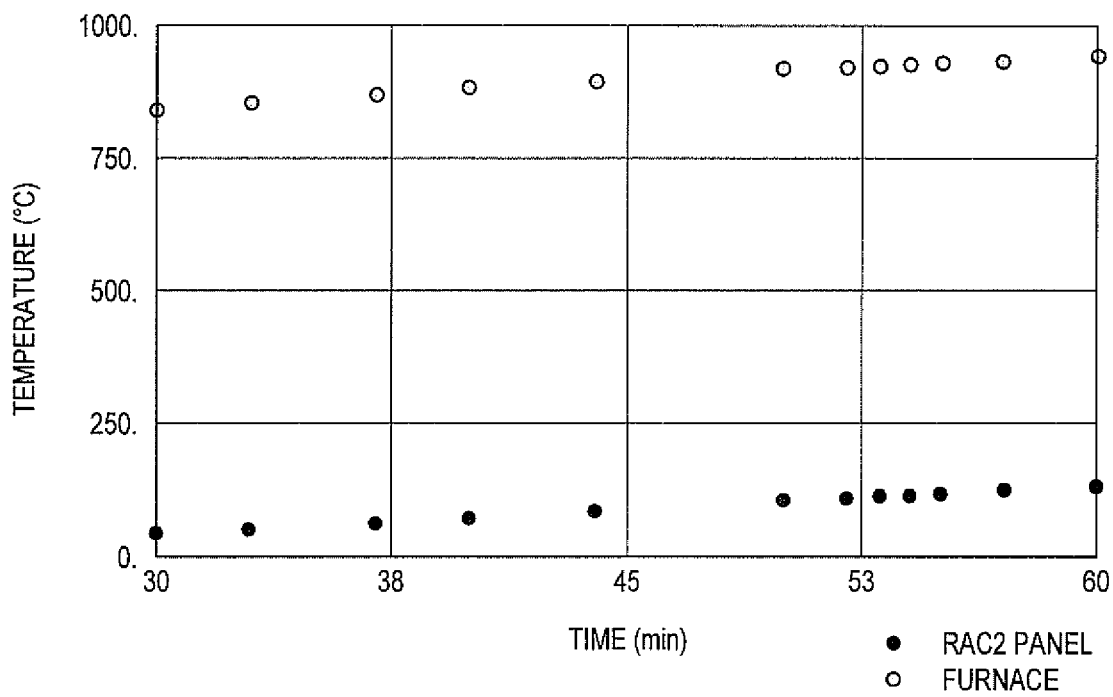
FIG. 14 is a 30 minute snapshot of the second half of an IMO FTP Code Part 3 fire test where one embodiment is used as the Thermal/Fire insulation material.

Turning to FIGS. 7 to 9, a form of insulation panel 20 is shown as panel 21 in the form of a board that includes a refractory or insulating panel body 22, a liner 26 applied to surfaces of the panel body 22. The liner 26 comprises the fire resistant composition (e.g. in the form of a cured resin) 24 and a glass fibre/basalt fibre/carbon fibre mat 27. The liner 26 is adhered to the panel body 22 via the fire resistant composition 24.

In this particular embodiment, the fire resistant composition 24 is applied to the surface of the panel body 22 in combination with a woven glass fibre liner 26. An advantage of using liner 26 is that it provides addition strength in tension along one or more directions in the plane of liner 26.

The liner 26 is applied or affixed to the panel body 22 by receiving the fire resistant composition in the form of a liquid (such as by rolling, brushing, or pouring the fire resistant composition thereon). The liner 26 is then adhered to a surface of the panel body 22, and subjected to temperatures and/or pressures to cure the fire resistant composition and form a composite panel 21. In an alternative arrangement, the fire resistant composition is applied to a surface of the panel body 22 in the form of a liquid and the liner 26 is then applied thereto before subjecting the fire resistant composition to temperatures and/or pressures to cure the fire resistant composition to form a composite panel 21.

It will be appreciated that other embodiments omit the liner 26, or liner 26 may compose of basalt fibre or carbon fibre, or the liner 26 may be applied using other techniques. In some embodiments the fire resistant composition is directly applied, such as in the form of a liquid, to the surface of the panel body 22 and then cured such that the insulation panel 20 is coated or impregnated with the fire resistant composition.

The composite panel 21 illustrated also comprises a vapour barrier 29 applied to the glass fibre mat surface 27 of the liner 26. The vapour barrier 29 may be in the form of Venture Tape (a product of the 3M Company) and/or for example aluminium foil (shown as item 29a in FIG. 8 and FIG. 9).

FIG. 9 shows that the composite panel 21 may also include a layer of an acoustic attenuation material 29b. Whilst FIG. 9 illustrates a layer on one side of the composite panel 21, the skilled addressee will appreciate that both sides of the composite panel 21 may have a layer of the acoustic attenuation material 29b.

An aesthetic veneer layer 29a can be added to the face and/or the back of the composite panel 21.

By way of example, to cure the composite panel 21, the composite panel 21 is introduced to a heated press and cured at gauge pressures between 0.1 and 10 bar and temperatures between 50° C. and 200° C. The panel is cured for 0.1 to 4 hours in the press, and then post-cured at room temperature for a few weeks or post-cured in a hot room for a few days.

In one or more forms of the invention, the composite panel 21 has a density of between about 10 and 1200 kg/m$^3$ and/or has a thermal conductivity profile as set out below:

TABLE 1

| Thermal conductivity profile | |
| --- | --- |
| Temperature ° C. | Thermal Conductivity W/m · K |
| 351 | 0.05-0.3 |
| 600 | 0.05-0.3 |
| 1000 | 0.05-03 |

In FIGS. 10 to 13 a different embodiment of the assembly 10 can be seen as indicated by 10a and 10b. In these embodiments the composite panels 21 may be formed or mounted in a shallow pan 51 of stainless steel via steel clips and pins or alternatively fitted within without such covers. The panels are then mounted within the general assembly 30a and 30b, on wall-mounted channels 52, directly or indirectly via rolled stainless steel stand-off brackets, or suspended channels, which themselves are filled with insulating material.

Assembly of the fire insulating assembly can be understood from the Figures, and at least from FIGS. 10, 11, 12 and 13. The mounting spacers are mounted on the walls, whether they are suspension hangers or plinths. Then, frame elements 52 are mounted on those mounting spacers, to form frame 30a and 30b. The composite panel 21 is located by locating the edges of the panels 21 on the locating recesses 53 or for embodiment 10b, are located central to the grid and screwed to the channel work.

Gaskets 41 are located within the channel work 52 to provide sufficient seal to the panel. Retaining strips 32 and retaining discs are placed on the panels 21 to form a seal along the seam joins and fastened to the frame elements 52 with screws.

Example 1

Process for Preparing the Fire Resistant Composition

Kaolin clay (1.73 kg) was mixed with D grade sodium silicate solution (3.46 kg) and the resultant mixture of kaolin solution was left to digest until the clay dissolved (approximately 5-15 minutes).

Epoxy Part A (279 g) was mixed with Part B (81 g) and mixed until Part A and B formed a polymerised epoxy mix.

Silane (300 g), siloxane (150 g) and the polymerised epoxy mix were added to the kaolin solution. The resultant mixture was stirred to form a smooth slurry (approximately for 3-5 minutes).

Although the above provides a specific composition, the skilled person will appreciate that a range of compositions is anticipated. Exemplary compositional ranges are provided in Table 2 below.

TABLE 2

| Compositional ranges for constituent ingredients of fire resistant resin | |
| --- | --- |
| Component | Weight Fraction (%) |
| Sodium Silicate | 50-65 |
| Metakaolin | 20-30 |
| Silane Coupling Agent | 1-10 |
| Siloxane Water Proofing Agent | 0.5-5 |
| Epoxy Part A | 4-12 |
| Epoxy Part B | 1-4 |

Example 2

Example Process A

Lengths of Venture tape (aluminium foil tape coated with an adhesive solvent) were placed adhesive side up on a work surface. The adhesive cover layers were removed from the tape prior to use. A glass fibre weave was placed on top of the adhesive lengths of the tape, so that the tape stuck to the weave. A fire resistant resin comprising at least: silane, HIP, epoxy parts A and B, and siloxane was applied to the glass fibre weave. A Mount Blue insulation panel was placed onto the first fire resistant resin soaked weave. A second glass fibre weave was then applied onto the exposed surface of the Mount Blue insulation panel. Further fire resistant resin was applied to the second glass fibre weave. Finally, aluminium foil was applied over the second HIPS soaked weave. The resultant laminate was held in a press and cured for 90 minutes at 70° C. to form a fire resistant glass fibre laminate applied to a panel body (ie the Mount Blue insulation panel).

Example Process B

Lengths of Venture tape were placed adhesive side up on a work surface. The adhesive cover layers were removed from the tape prior to use. A glass fibre weave was placed on top of the adhesive lengths of the tape, so that the tape stuck to the weave. A fire resistant resin comprising at least: silane, HIP, epoxy parts A and B, and siloxane was applied to the glass fibre weave. Short glass fibres were spread evenly over the fire resistant resin. A Mount Blue insulation panel was placed onto the first fire resistant resin soaked weave. A second glass fibre weave was then applied onto the exposed surface of the Mount Blue insulation panel. Further fire resistant resin was applied to the second glass fibre weave. Short glass fibres were spread evenly over the fire resistant resin. Finally, aluminium foil was applied over the second fire resistant composition soaked weave. The resultant laminate was held in a press and cured for 90 minutes at 70° C. to form a fire resistant glass fibre laminate applied to a panel body (ie the Mount Blue insulation panel). The short glass fibres increased the adhesion between the fire resistant resin and the insulation panel.

Example Process C

An insulation board was placed on a work surface. A first glass fibre weave was placed on the board. A fire resistant resin comprising at least: silane, HIP, epoxy parts A and B, and siloxane was applied to the glass fibre weave. Ventura tape was applied over the surface of the first resin soaked weave. The board was then flipped. On the reverse side was placed a second glass fibre weave. Further fire resistant resin was applied to the second glass fibre weave. Aluminium foil was then applied over the second HIPS soaked weave. The resultant laminate was held in a press and cured for 90 minutes at 70° C. to form a fire resistant panel.

Example Process D

An insulation board was placed on a work surface. A first glass fibre weave was placed on the board. A fire resistant resin comprising at least: silane, HIP, epoxy parts A and B, and siloxane was applied to the glass fibre weave was applied to the glass fibre weave. Short glass fibres were spread evenly over the fire resistant resin. Ventura tape was applied over the surface of the resin soaked weave. The board was then flipped. On the reverse side was placed a second glass fibre weave. Further fire resistant resin was applied to the second glass fibre weave. Short glass fibres were spread evenly over the fire resistant resin. Finally, aluminium foil was applied over the second fire resistant composition soaked weave. The resultant laminate was held in a press and cured for 90 minutes at 70° C. to form a fire resistant panel.

Example Process E

An insulation board was placed on a work surface. A fire resistant resin comprising at least: silane, HIP, epoxy parts A and B, and siloxane was applied to the board. A first glass fibre weave was placed on the resin soaked board. Ventura tape was applied over the surface of the first glass fibre weave. The board was then flipped. On the reverse side, fire resistant resin was applied to the board. A second glass fibre weave was applied onto the resin. Finally, aluminium foil was applied over the second resin soaked weave. The resultant laminate was held in a press and cured for 90 minutes at 70° C. to form a fire resistant panel.

Example Process F

An insulation board was placed on a work surface. A fire resistant resin comprising at least: silane, HIP, epoxy parts A and B, and siloxane was applied to the board. Short glass fibres were spread evenly over the fire resistant resin. A first glass fibre weave was placed on the resin soaked board. Ventura tape was applied over the surface of the first glass fibre weave. The board was then flipped. On the reverse side, fire resistant resin was applied to the board. Short glass fibres were spread evenly over the surface of the fire resistant resin. A second glass fibre weave was applied onto the resin. Finally, aluminium foil was applied over the second resin soaked weave. The resultant laminate was held in a press and cured for 90 minutes at 70° C. to form a fire resistant panel.

Example 3

Resin was prepared according to Example 1 above. A fire resistant panel and non-fire resistant panel were manufactured using the process of Example 2, Example Process A. The boards prepared ie panel 20 (Marine Board+HIPS) and blank 22 (Marine Board) had a thickness of 20 mm and density of 160 kg/m$^2$.

Figure 15:
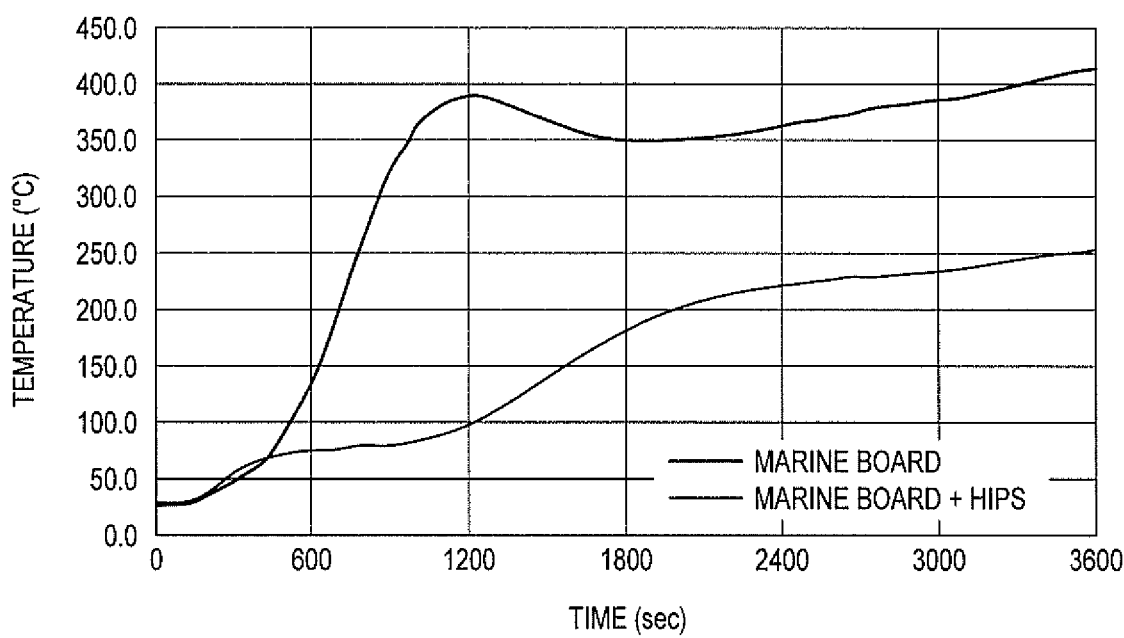
FIG. 15 is a comparison test between two materials during a pilot fire test as mentioned hereinabove, one panel being the thermal/fire insulating blank and the other being a composite material of one embodiment of the present technology.

It can be seen from FIG. 15 that in a test rig, with about 950 Celsius on one side, the performance of the panel 20 (Marine Board+HIPS) outstrips that of the blank 22 (Marine Board) by itself.

Example 4

Resin Evaluation

A first series of experiments were conducted to evaluate the effect of varying the type of epoxy resin used to form the HIPS polymer and to investigate the use of different silane coupling agents in the resin composition.

Table 3 below provides the compositional ranges for the fire resistant resin used in this Example.

TABLE 3

Typical composition ranges for the fire resistant resin

| Reagent | Role | Typical loading wt % |
|---|---|---|
| Sodium silicate solution | Reagent to form inorganic backbone with Metakaolin | 50-60 |
| Metakaolin | Inorganic clay powder to interact with sodium silicate | 25-30 |
| Silane | Coupling agent for inorganic and organic compounds | 2-10 |
| Epoxy | Organic adhesive | 5-15 |
| Siloxane | Water repellent | 1-5 |

The fire resistant resins were prepared according to the method outlined below:

TABLE 4

Fire resistant resin preparation method

| Step No. | Description |
|---|---|
| 1 | Sodium Silicate Solution weighed |
| 2 | Metakaolin added to Sodium Silicate |
| 3 | Mixture introduced to a Digital IKA RW 20 Stirrer from Crown Scientific |
| 4 | Stirrer increased to 1500 rpm |
| 5 | Stirring continues until Metakaolin has totally mixed into the Sodium Silicate - 10 minutes |
| 6 | Solution is left to age for 60 minutes |
| 7 | Coupling Agent is added - 1 minute |
| 8 | Siloxane is added - 1 minute |
| 9 | Part A and Part B of epoxy are reacted then added - 5 minutes |
| 10 | All additives are placed in a beaker |
| 11 | The mixture is introduced to a stirrer. |
| 12 | Stirrer speed is increased to 1500 rpm and stirring continues until all additives are fully dispersed into the resin - 10 minutes |
| 13 | The resin is removed from the stirrer and is ready for usage |

The compositions of the two preferred formulations (referred to as Formulation 1 and Formulation 2 throughout this example) are provided in Table 5 below.

TABLE 5

Composition of Formula 1 and Formula 2

| Formulation | Epoxy | Silane | Siloxane | Geopolymer |
|---|---|---|---|---|
| 1 | 6 wt % 1:0.391 Megapoxy HX Part A:HY2954 Part B | 5% 3-Glycidoxypropyl trimethoxy silane | 2.5% Wacker SIL RES BS66 | 86.5% 2:1 Sodium Silicate:metakaolin |

TABLE 5-continued

Composition of Formula 1 and Formula 2

| Formulation | Epoxy | Silane | Siloxane | Geopolymer |
|---|---|---|---|---|
| 2 | 1:0.29 Hexion RIMR 935:Hexion RIMH936 | 5% 3-Glycidoxypropyl trimethoxy silane | 2.5% Wacker SIL RES BS66 | 86.5% 2:1 Sodium Silicate:metakaolin |

Lap Shear Adhesion

To test the adhesion of the developed fire resistant resins, Tasmanian Oak wood substrates were employed. Essentially, two overlapping pieces of Tasmanian Oak timber were joined via the resin. The overlapping distance area between the two pieces of timber was 15 mm. The fire resistant resin was cured overnight in a conventional oven at 70° C. and then cut into 15 mm strips and tested for adhesion.

Figure 16:
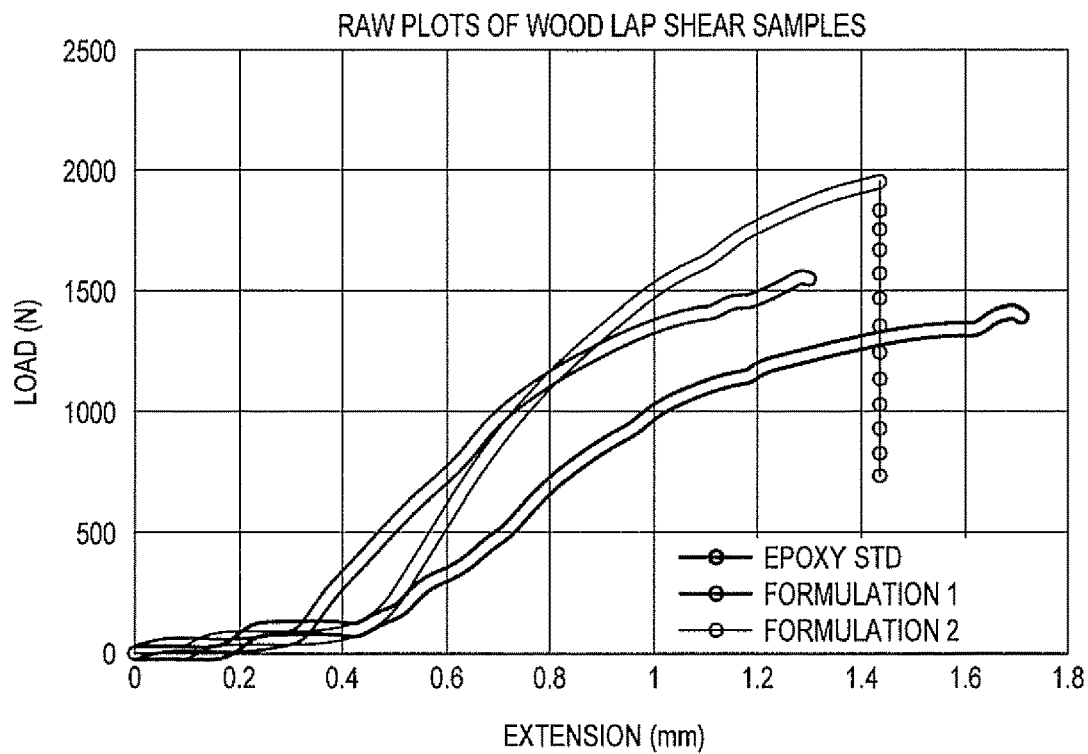
FIG. 16 is a graph of Load vs. Extension which shows adhesion results for Formulation 1 and Formulation 2 compared with a commercial epoxy material.

The results of an Adhesion Lap shear test are shown in FIGS. 16, 17, 18 and 19. FIG. 16 displays raw trace results obtained based on two variations of the fire resistant resin formulations with an epoxy loading of 10%.

From these adhesion results, it was evident that the fire resistant resin outperformed straight epoxy on a wood substrate. The fire resistant resin should also be applicable on other substrates and composite components preferred as part of the final laminate prototype make-up for application. This make-up comprises of a glass fibre, blue insulation material supplied by Unifrax and Venture Tape supplied from 3M.

Figure 17:
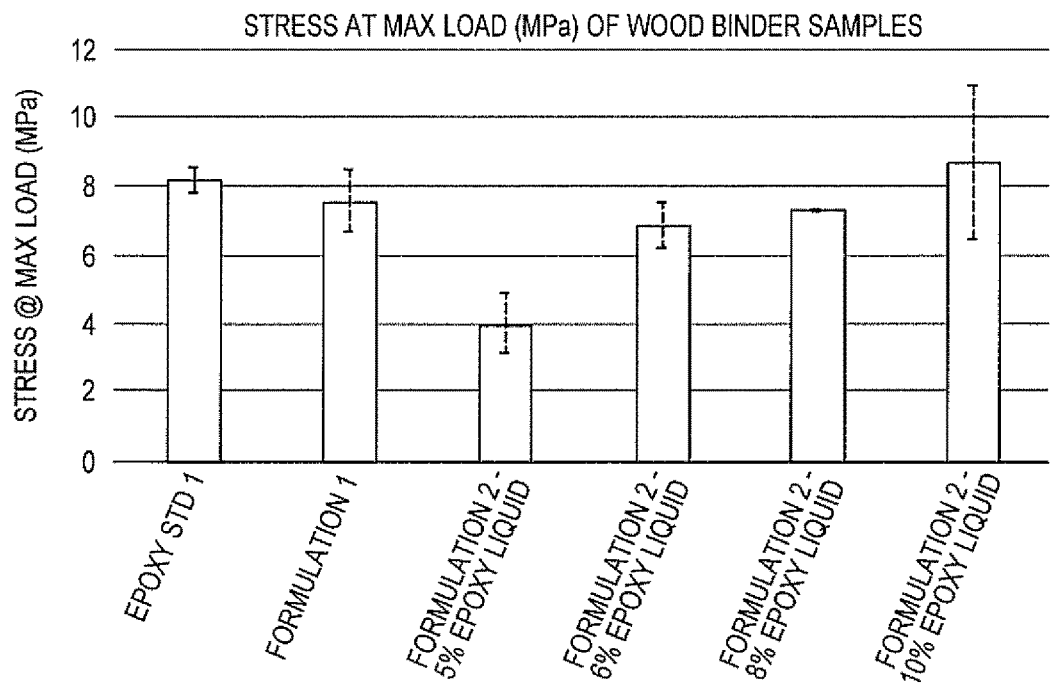
FIG. 17 is a graph showing stress at maximum load (MPa) for wood binder samples treated with fire resistant compositions based on Formulation 2 but with different Epoxy loadings.
Figure 18:
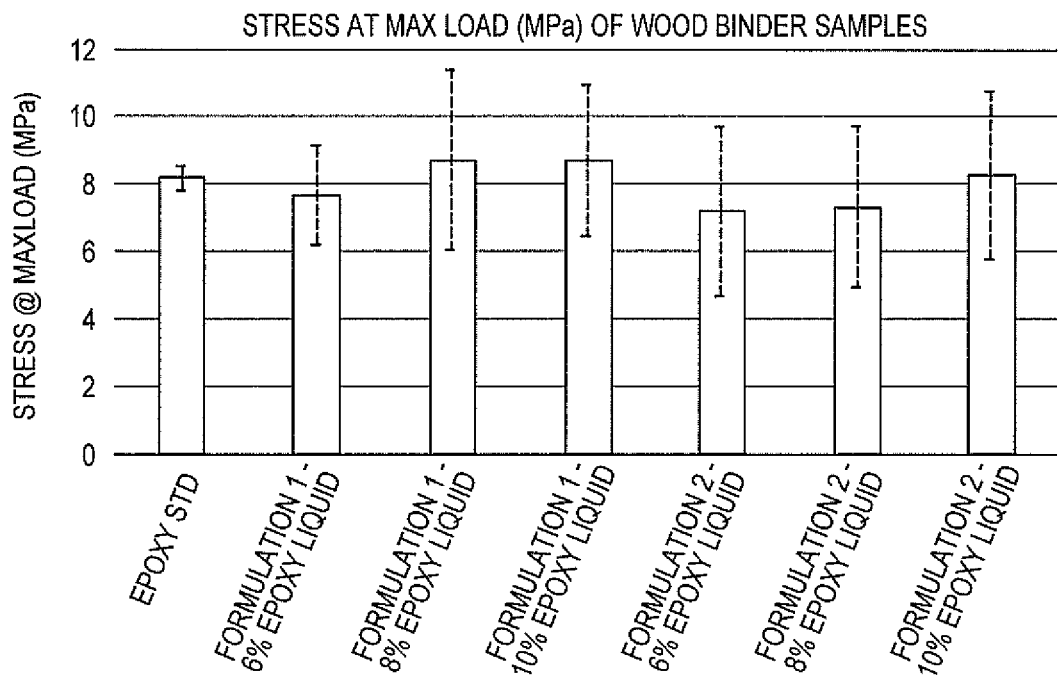
FIG. 18 is a graph showing stress at maximum load (MPa) for wood binder samples treated with fire resistant compositions based on Formulations 1 and 2 but with epoxy loadings of 6, 8 and 10 wt %.

Results shown in FIG. 17 of Stress Loads vs Epoxy content in formulations indicate considerable difference when going from 5 to 6% epoxy loading and then not a great difference between 6 and 10%. A lower epoxy loading would not only save cost but could potentially exhibit better fire performance. The difference between an epoxy loading of 6 and 10% was repeated for Formulation and tested on another candidate prospect, Formulation (FIG. 18).

Figure 19:
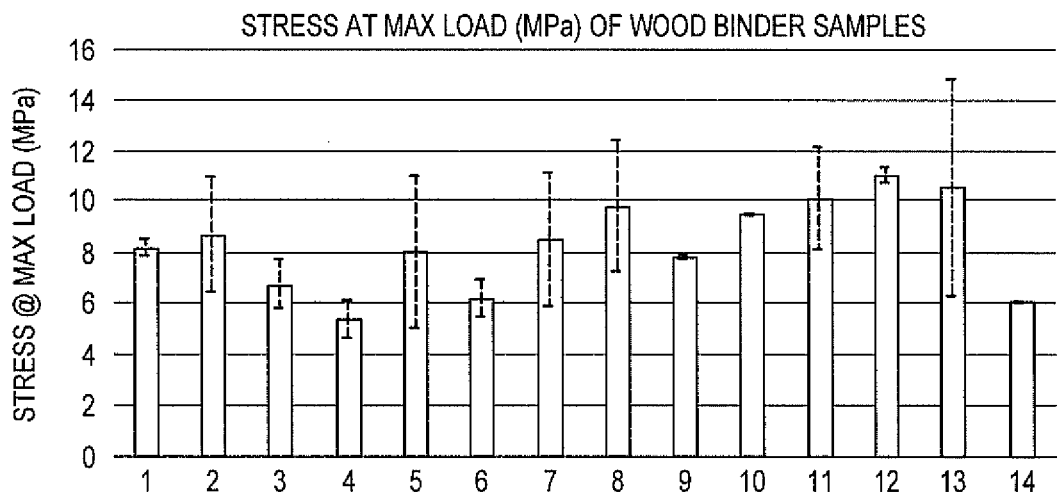
FIG. 19 is a graph showing stress at maximum load (MPa) for wood binder samples treated with fire resistant compositions with different water proofing agents and silane coupling agents as outlined in Table 6.

Improved performance was observed using a loading of 6% epoxy for both Formulations 1 and 2. At the same time that formulations were being optimised for adhesion, the performance of resins incorporating different water proofing agents and an alternate silane coupling agent were also analysed. An example of such results is shown in FIG. 19, with accompanying plot indicators outlined in Table 6 below.

TABLE 6

Resin Formulations

| No. | Epoxy | Silane | Siloxane |
|---|---|---|---|
| 1 | 100% (Megapoxy HX:Aradur 2954 1:0.391) | | |
| 2 | 10% (Megapoxy HX:Aradur 2954 1:0.391) | 5% 3-Glycidoxypropyl trimethoxy silane | 2.5% Silanol terminated polydimethyl siloxane |
| 3 | 10% (Megapoxy HX:Aradur 2954 1:0.391) | 2.5% 3-Glycidoxypropyl trimethoxy silane | 2.5% Silanol terminated polydimethyl siloxane |
| 4 | 10% (Megapoxy HX:Aradur 2954 1:0.391) | 5% 3-Aminopropyl triethoxy silane | 2.5% Silanol terminated polydimethyl siloxane |
| 5 | 10% (Megapoxy HX:Aradur 2954 1:0.391) | 5% 3-Glycidoxypropyl trimethoxy silane | 1% Protectosil BHN |
| 6 | 10% (Megapoxy HX:Aradur 2954 1:0.391) | 5% 3-Glycidoxypropyl trimethoxy silane | 2.5% Protectosil BHN |
| 7 | 10% (Megapoxy HX:Aradur 2954 1:0.391) | 5% 3-Glycidoxypropyl trimethoxy silane | 5% Protectosil BHN |
| 8 | 10% (Megapoxy HX:Aradur 2954 1:0.391) | 5% 3-Glycidoxypropyl trimethoxy silane | 1% Protectosil WS808 |
| 9 | 10% (Megapoxy HX:Aradur 2954 1:0.391) | 5% 3-Glycidoxypropyl trimethoxy silane | 2.5% Protectosil WS808 |
| 10 | 10% (Megapoxy HX:Aradur 2954 1:0.391) | 5% 3-Glycidoxypropyl trimethoxy silane | 5% Protectosil WS808 |
| 11 | 10% (Megapoxy HX:Aradur 2954 1:0.391) | 5% 3-Glycidoxypropyl trimethoxy silane | 1% Protectosil WS808, 2.5% Protectosil WS808 (3.5 wt % in total) |
| 12 | 10% (Megapoxy HX:Aradur 2954 1:0.391) | 5% 3-Glycidoxypropyl trimethoxy silane | 2.5% Wacker SIL RES BS66 |
| 13 | 10% (Megapoxy HX:Aradur 2954 1:0.391) | 5% 3-Aminopropyl triethoxy silane | 2.5% Protectosil BHN |
| 14 | 10% (Megapoxy HX:Aradur 2954 1:0.391) | 5% 3-Aminopropyl triethoxy silane | 2.5% Protectosil WS808 |

Two different silane coupling agents were tested. These were 3-glycidoxypropyl trimethoxysilane and 3-aminopropyltriethoxy silane. The results indicated that 3-glycidoxypropyl trim ethoxysilane provides better adhesion properties than 3-aminopropyltriethoxy silane.

Without wishing to be bound by theory, the inventors are of the view that this is due to the presence of the glycidyl group (e.g. epoxy group) in the 3-glycidoxypropyl trimethoxysilane. The inventors are of the view that the lack of an epoxy functional group within the structure of 3-aminopropyltriethoxy silane is responsible for the reduction in its ability to bond as effectively as the 3-glycidoxypropyl trimethoxysilane compound. The amino functional group ($-NH_2$) does have reactive potential, through a lone pair of electrons on the N, but this is thought to be less strong than the epoxy in the surrounding aluminosilicate environment. Furthermore, the epoxy functional group may provide a higher frequency of bonding options to the inorganic matrix as well as being a stronger coupling partner to the organic hardener that cures the commercial epoxy component.

Flexural Strength

To test flexural strength, 3 layered glass fibre composites were fabricated as outlined in Table 7. The fire resistant resin was then spread using a squeegee and spatula on both sides of each glass fibre layer and the system was initially cured for 210 minutes at 70° C. Fabricated laminates were then post cured overnight at 70° C. and cut for testing.

TABLE 7

Glass laminate fabrication preparation method

| Step No. | Description |
|---|---|
| 1 | The fire resistant resin prepared as described above |
| 2 | A first layer of glass fibre is cut to size - 150 mm × 210 mm |
| 3 | The fire resistant resin is applied to the layer of glass fibre as a coating |
| 4 | The coating is evenly distributed by using a squeegee |
| 5 | A second glass fibre is cut and resin is applied |
| 6 | The 2 prepared layers are sandwiched together |
| 7 | The fire resistant resin is applied to the top of sandwiched layers 1 and 2 |
| 8 | The fire resistant resin is evenly distributed using a squeegee |
| 9 | A third glass fibre layer is prepared |
| 10 | The third layer is sandwiched onto the 2nd prepared layer |
| 11 | The fire resistant resin is applied to the 3rd layer |
| 12 | The fire resistant resin is evenly distributed by using a squeegee |
| 13 | A Teflon film is introduced to the top and bottom of the prepared layers |
| 14 | Top and bottom steel plates are added |
| 15 | The sample is placed into a heated platen press pre-warmed to 70° C. |
| 16 | The platens are closed and the sample is cured for 210 min at 70° C. |
| 17 | The laminate is removed and post cured overnight at 70° C. |
| 18 | The laminate is cut to size for flexural testing (12.7 mm by >60.8 mm) |
| 19 | The test specimens are tested for flexural strength |

An Instron type 5569 (Serial number C5450) was used to test the flexural strength of the composites. Testing was performed to ASTM D 790-07 using a 3 point bend jig. The specimens were 3 mm thick, 12.7 mm wide and greater than 60.8 mm in length. A 500N Load cell was utilised and the specimens were tested at a cross-head speed of 1.28 mm/min until the maximum strain in the outer surface of the specimen reached 0.05 mm/mm or if the specimen failed through breakage.

Figure 20:
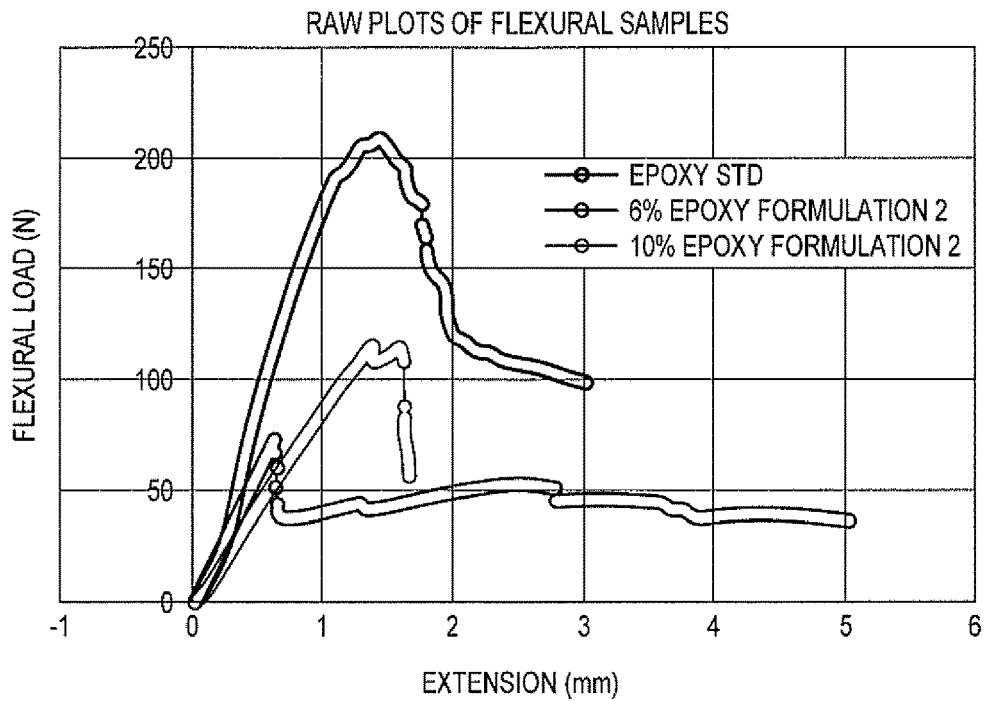
FIG. 20 is a graph showing Flexural Load (N) vs. Extension (mm) for wood binder samples treated with fire resistant compositions according to Formulation 2, but with Epoxy loadings of 6 wt % and 10 wt % in comparison with an Epoxy standard.

FIG. 20 shows results between Epoxy and HIPS candidate formulations were more pronounced when measuring for flex. Samples fabricated to measure Flexural Strength consisted of a 3 layer glass fibre system with fire resistant resin in between each layer.

The results indicate that the ductility reduces as the epoxy loading is decreased. 6% epoxy may still possess enough ductility for the intended application. Impact testing and durability assessments would confirm this. Other physical advantages of a lower organic epoxy content would include safer fire performance with less organic volatiles being emitted and a bigger potential for the laminate to maintain its structural integrity.

Contact Angle Measurement

The fire resistant resin was coated onto a glass microscope and then contact angle was measured. A Rame-Hart Manual Contact Goniometer (Model 100-00-230, Serial 3107), was employed to determine the level of hydrophobicity of the fire resistant compositions by measuring the contact angle of a small water droplet as it sat on the coating's surface.

Figure 21:
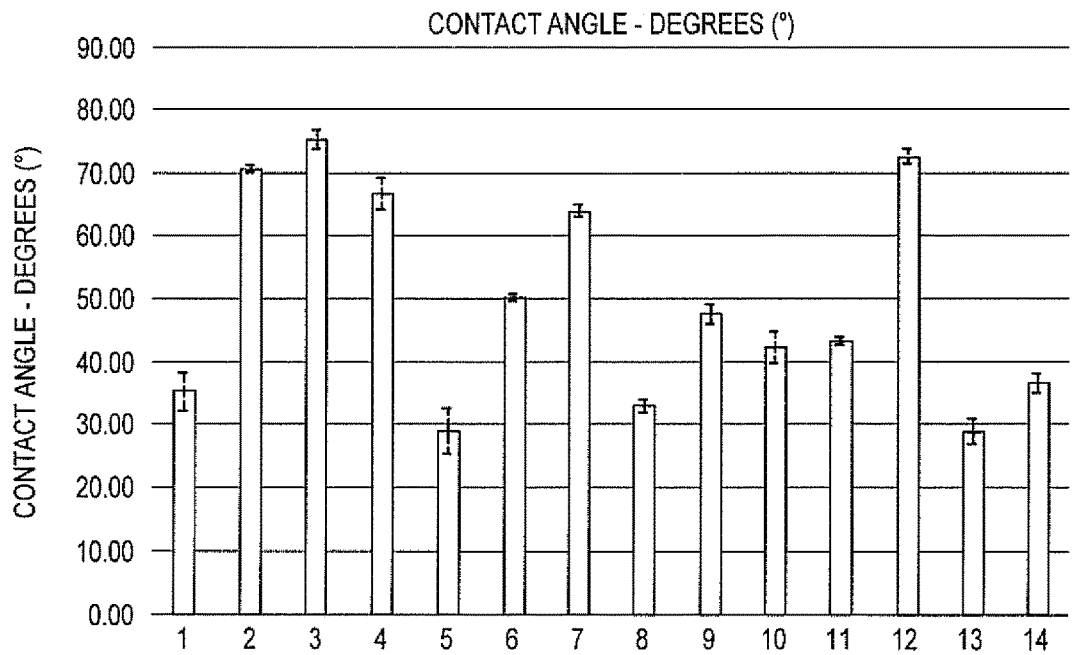
FIG. 21 is a graph showing contact angle (degrees) for the fire resistant composition with different water proofing agents and silane coupling agents as outlined in Table 6.

The contact angle measurements are shown in FIG. 21. The descriptors in FIG. 21 correspond with the sample numbers from Table 6 above.

Two types of water proofing agents exhibited excellent contact angle performance, these were (i) Silanol Terminated Polydimethyl Siloxane from Gelest, Inc. and (ii) SILRES BS 66, liquid oligomeric siloxane, from Wacker Chemie AG. The SILRES BS 66 exhibited better durability performance and good miscibility with the other HIPS components.

Figure 22:
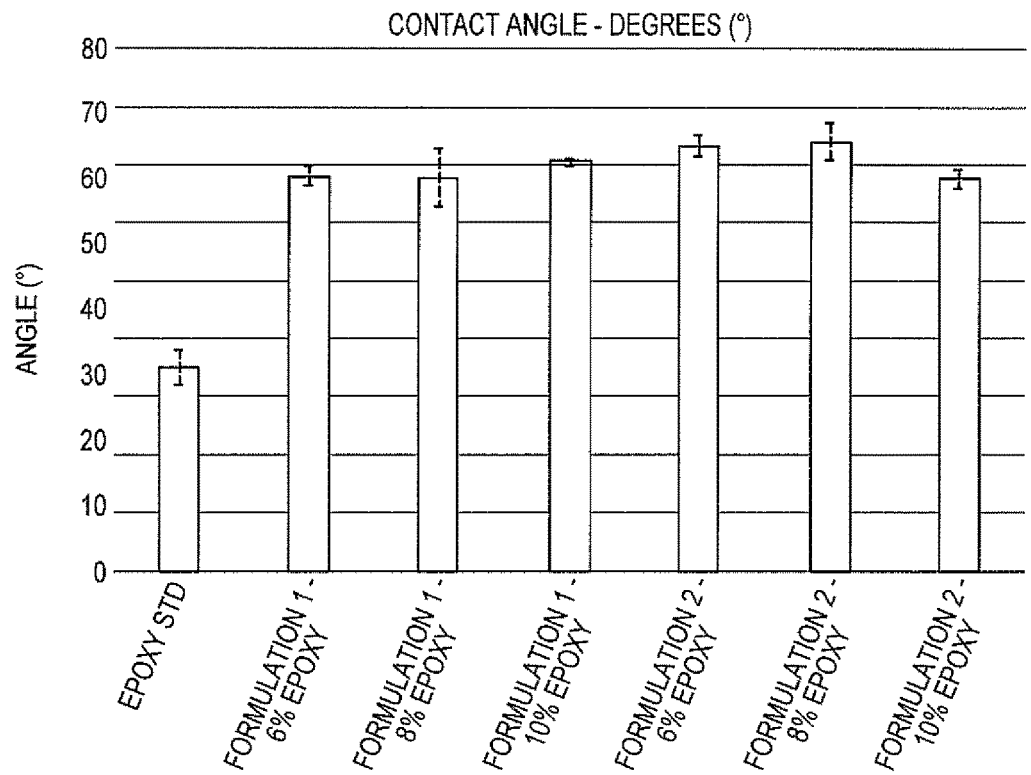
FIG. 22 is a graph showing contact angle (degrees) with fire resistant compositions based on Formulations 1 and 2 but with epoxy loadings of 6, 8 and 10 wt %.

Upon choosing between an epoxy loading between 6 and 10% with this favoured water proofing agent, the contact angles were measured to determine if there was a difference in performance. Angles around 70° were obtained for all candidate formulation modifications (FIG. 22) indicating little variation when a loading of 2.5% SIL RES BS 66 was utilised.

Rheology

The resin viscosity and pot-life can provide useful information as to the flow-ability and application life. A Haake Rheostress 600 from Thermo Electron Corporation (Type 222-1690) was the primary instrument employed to measure the viscosity. Resin was subject to a frequency of 1 Hertz and a constant stress of 10 Pascal at temperatures of 25, 50 and 70° C.

Figure 23:
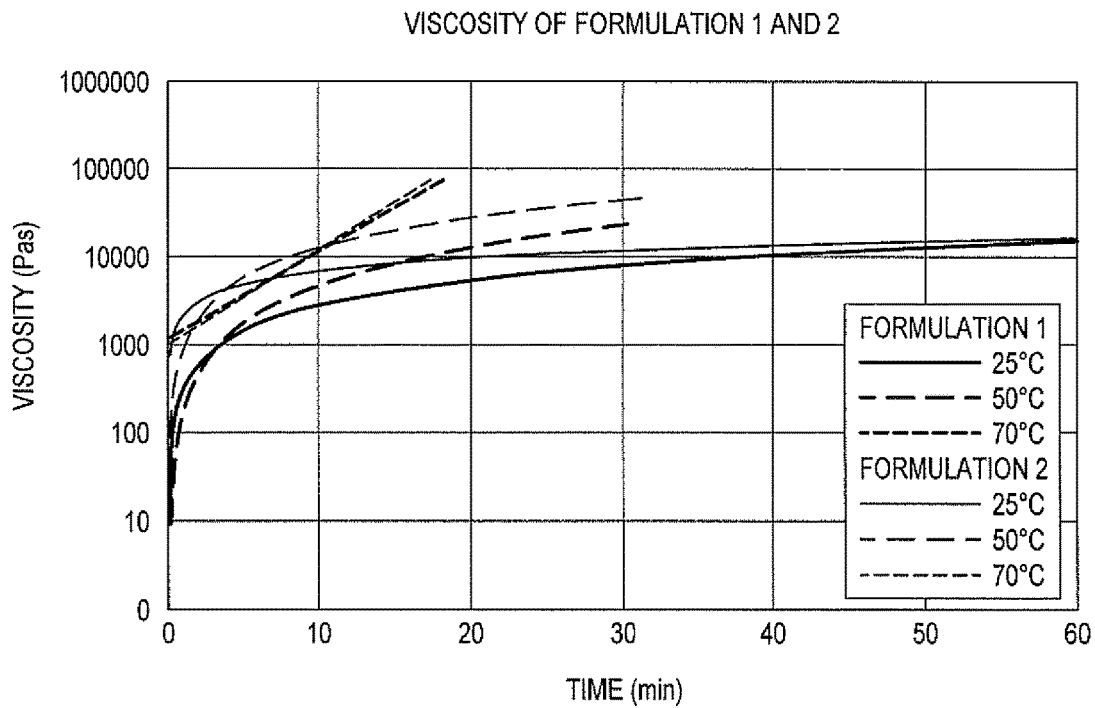
FIG. 23 is a graph showing viscosity (Pa·s) at 25, 50 and 70° C. for Formulations 1 and 2.

FIG. 23 shows results obtained from Haake Rheostress Rheometer measurements of resin viscosity at several application temperatures.

The curing time of the fire resistant resin when exposed to a press at 70° C. was observed to be around 15 minutes. For 50° C., curing time is just over 30 minutes. At Room temperature results using the Haake Rheostress Rheometer were inconclusive. It was difficult to find the appropriate instrumentation to measure such properties at this temperature as HIPS formulations tend to have thixotropic properties indicating that the resin maintains flow as it is stirring but once left without agitation, it tends to reside in a cream composition. As the measuring techniques of other viscosity instruments such as the Brookfield Viscometer and the AND Vibro Viscometer unit require the resin to remain still while the machine components are mobile, readings obtained were very high, above the limitations of the unit's upper specifications.

These results demonstrate that pot life can withstand a normal work shift cycle, that is, the resin is still practical to spread and utilise even after 6 hours when kept at room temperature.

Panel Testing

Laminate panels were constructed with the freshly prepared fire resistant resin on a flat laboratory bench and then transferred to the relevant curing press to enable the interfaces of each material to bond. Testing of the cured laminates focused on fire resistance performance and durability under saline conditions. The panel fabrication methodology is outlined in Table 8 below.

TABLE 8

Panel fabrication preparation method

| Step No. | Description |
|---|---|
| 1 | Blue Insulation Panel cut to size |
| 2 | Glass fibre cut to cover Blue Insulation Panel |

TABLE 8-continued

Panel fabrication preparation method

| Step No. | Description |
|---|---|
| 3 | The HIPS resin is applied to the fibre |
| 4 | The coating is evenly distributed by using a squeegee or roller |
| 5 | The resin totally covers the glass fibre |
| 6 | The Venture Tape is placed on the glass fibre and HIPS resin |
| 7 | The Panel is flipped over and the glass fibre covers Blue Insulation material |
| 8 | The glass fibre is uniformly covered with HIPS resin |
| 9 | A second Venture Tape film is applied (if required) |
| 10 | Panel is placed into press with spacer inserts to protect Blue Insulation |
| 11 | The Platens are closed at a pressure of 0.8 ton |
| 12 | The panel is left to cure for 90 minutes at 70° C. |
| 13 | The cured panel is removed from the press and the flashing is cut away |
| 14 | The cured panel is placed in its support bracket |

Fire Performance

A fire testing jig was fabricated to measure the fire performance of panels fabricated with Formulations 1 and 2 of dimensions 95 mm×95 mm×30 mm. This test consisted of mounting a specimen at 90°, then applying a flame for a period of two minutes at a distance of 80 mm. After 2 minutes the flame was removed and the samples ability to self-extinguish was detected as well as the level of flame damage and temperature on the reverse side.

Figure 24:
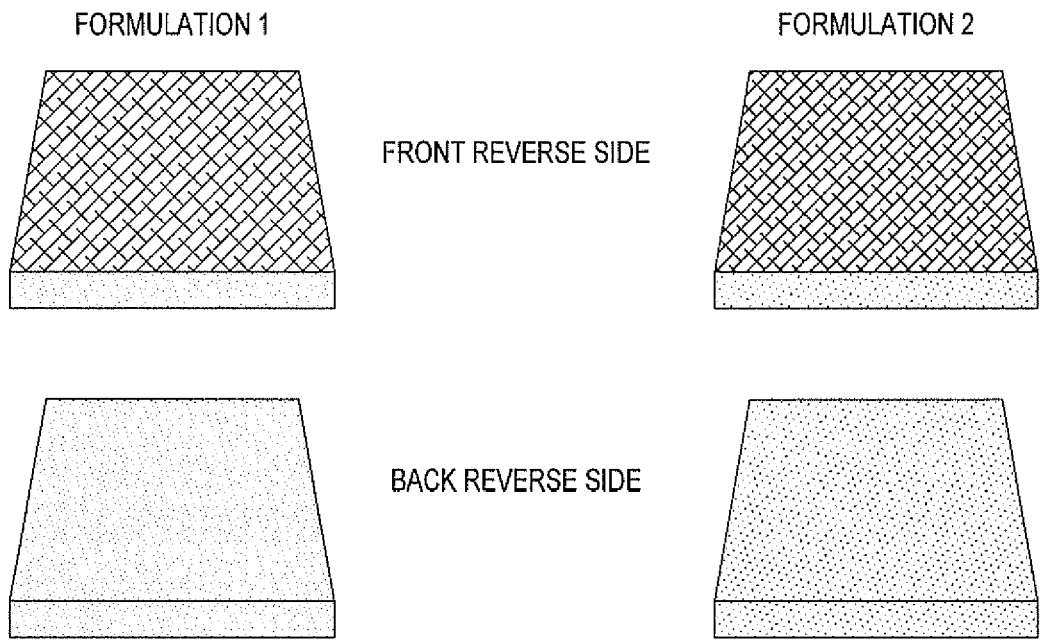
FIG. 24 is a photograph showing no damage apparent on rear side of panels after flame testing.

FIG. 24 shows that the most important outcomes to take out of this test is the lack of flammability of the HIPS coated layers and the appearance of the reverse side of the panel. The flame fails to penetrate through the entire panel and the reverse side is still quite cool to touch immediately after testing. This indicates that the HIPS is potentially providing a barrier between the flame and the blue panel, acting as an obstruction to heat at the layer being exposed. The Venture Tape is highly flammable and burns continuously when tested on its own. When the flame is exposed to the front Venture Tape side of the composite for Formulations 1 and 2, there is initial ignition. The spread of fire then subsides once the Venture Tape has burnt away and the HIPS coating seems to begin absorbing the flame's intensity. When the flame is exposed to the back HIPS layer, there is no sign of ignition and the front face remains in pristine condition, maintaining its room temperature features.

There were very little volatiles being emitted into the atmosphere, especially when the back side HIPS only layer was tested. This is most probably due to the largely inorganic component, and therefore low Carbon amounts present, in the HIPS formulation. A final observation was the ability of the HIPS layer to maintain its structural composition during and after testing (FIG. 24). There was only minor damage done to the HIPS coating, with only a slight crack witnessed at the exposure site, which was probably due to the material becoming brittle upon organic removal.

Salt Solution Immersion

Fabricated Panels of dimensions 95 mm×95 mm×30 mm and glass laminates of dimensions 60 mm×60 mm×3 mm were fully immersed in a 3.5% salt solution for 42 days to simulate exposure to marine conditions. There was no sign of laminate destruction throughout the 42 day test

Example 5

A series of experiments were conducted to evaluate the effect of changing the ratio of metakaolin to sodium silicate and to investigate varying the amount of siloxane added to the composition.

This example is based on the following composition (generally referred to below as the base formulation composition):

85.7 wt % geopolymer (formed from sodium silicate (57.1 wt %) and metakaolin (28.6 wt %);
6% Epoxy (1:0.29 Hexion Epikote RIM935:Hexion Epikure RIMH936 at 4.65 and 1.35 wt % respectively)
0.3 wt % Zinc Oxide;
0.5 wt % bluestone colour oxide;
2.5 wt % siloxane (Wacker Silres BS 66); and
5 wt % silane coupling agent (3-glycidoxypropyltrimethoxy silane).

Varying the Metakaolin to Sodium Silicate Ratio

Figure 25:
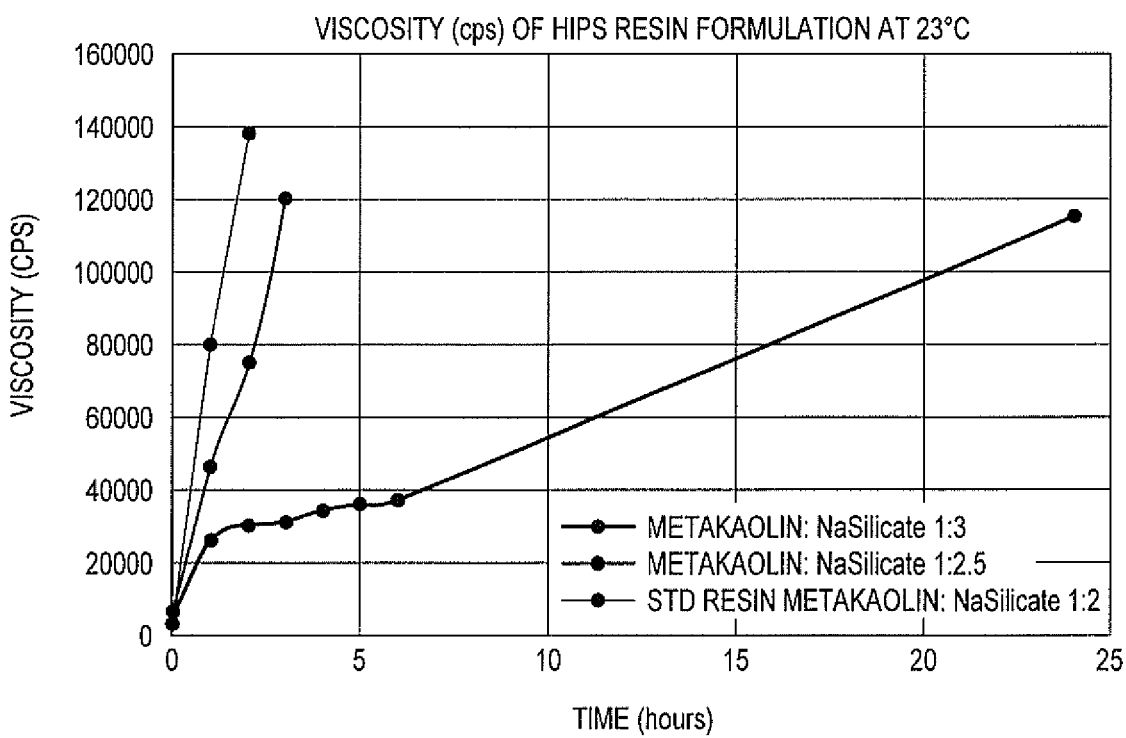
FIG. 25 is a graph showing the viscosity of the fire resistant resin with varied ratios of metakaolin to sodium silicate.

FIG. 25 displays viscosity results for the fire resistant resin at the below listed ratios:

(1) metakaolin to Sodium Silicate Solution ratio of 1:2 (e.g. the base formulation)
(2) metakaolin to Sodium Silicate Solution ratio of 1:2.5
(3) metakaolin to Sodium Silicate Solution ratio of 1:3

The results show that a metakaolin to Sodium Silicate Solution ratio of 1:3 provides good flow even after 24 hours and is still spreadable after 48 hours.

In addition to the above, the adhesion strength, wettability, and impact strength were also tested at the different metakaolin to sodium silicate ratios. The inventors found that:

a higher loading of sodium silicate slightly increases the resin's adhesion capabilities especially if curing occurs within the first 24 hours of the resin's pot life;
there was little difference in the measured contact angle between the different formulations; and
there was little difference in the results from a drop dart impact test.

Varying the Amount of Siloxane and/or Silane

Figure 26:
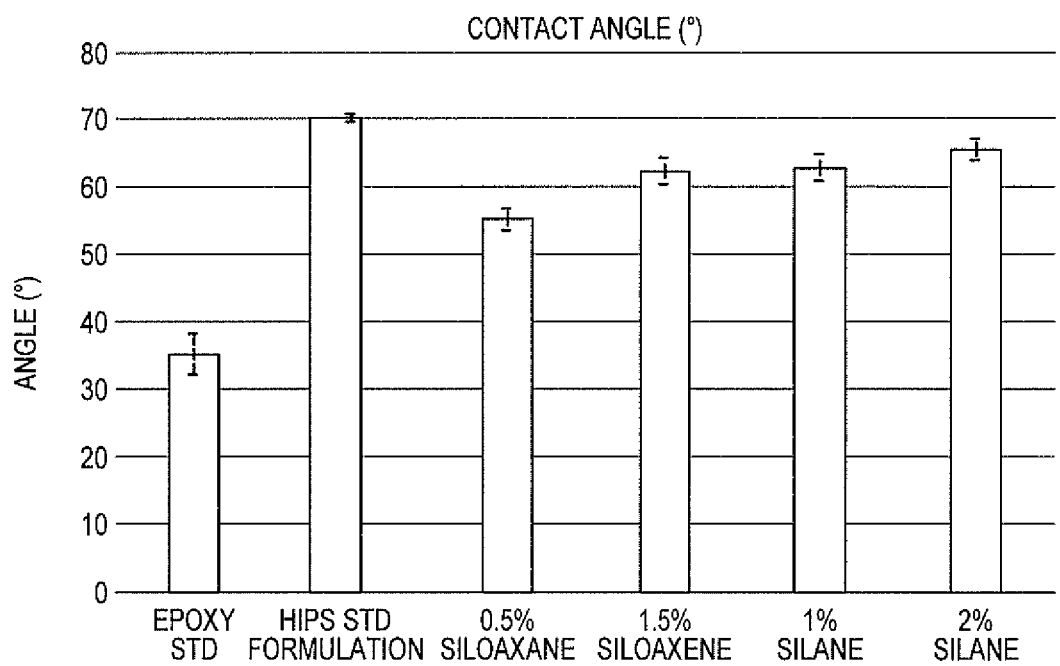
FIG. 26 is a graph showing contact angle (degrees) with fire resistant compositions with varying amounts of siloxane and silane.

The following fire resistant resin was prepared for the purpose of providing a base composition upon which to evaluate the effect of silane and siloxane content on the water repellence of the composition:

The silane and siloxane contents were adjusted to determine their effect on contact angle. FIG. 26 shows that reducing the amount of silane and/or siloxane reduces the water repellence of the HIPS resin. Notwithstanding this, the level of water repellence at these lower silane and/or siloxane levels is still likely to be suitable for marine applications.

Example 6

Standard Fire Tests

The following example reports results from standard fire tests on a class A-60 load bearing aluminium bulkhead and a class A-60 load-bearing deck to which the fire resistant composition has been applied.

TABLE 9

| Composition | |
|---|---|
| Component | Weight Fraction (%) |
| Metakaolin | 28.83 |
| Sodium Silicate | 57.63 |
| Epoxy Part A Hexion MGS Epoxy RIM935 | 4.65 |
| Epoxy Part B Hexion MGS Hardener RIMH936 | 1.35 |

TABLE 9-continued

| Composition | |
|---|---|
| Component | Weight Fraction (%) |
| Silane 3-Glycidoxypropyltrimethoxysilane | 5.00 |
| Siloxane SIL RES BS 66 | 2.50 |

Standard Fire Test 1

The purpose of the test is to determine the fire resistance of a class A-60 load-bearing aluminium bulkhead according to IMO FTP Code 2010 Part 3 of Annex 1 of 2010 IMOFTP Code.

Description of Prototype

The aluminium bulkhead was built according to APPENDIX 1 of IMO 2010 FTP Code Part 3, insulated on the stiffened side exposed to the fire with Rapid Access Composite PLUS (RAC+) bulkhead structural fire protection system consisting of a composite panels supported by a stainless steel frame work mounted with an air gap of 150 mm between the panels and the ship bulkhead. RAC+ panel, having dimension of 2383×1183 mm and thickness of 20 mm, is composed of a layer of non-combustible Marine Panel material having a nominal density of 160 kg/m$^3$ facing on both sides by means of the fire resistant composition described herein (i.e. a fire resistant composition including at least: silane cross-linked HIP and siloxane) impregnated into a fiberglass cloth and covered with a self-adhesive veneer named VentureClad-1577CW-WML (on the fire-exposed side) or aluminium foil (on the unexposed side). The panels are mounted inside a framework created by 0.45 mm thick stainless steel channels. The framework is fixed to the aluminium bulkhead stiffeners using Omega shaped standoff brackets, having dimension of 50×100×150 mm. Joints between panels are covered with stainless steel cover strips, which are insulated with 6 mm thick Superwool paper having density of 230 kg/m$^3$ and screwed to the framework at nominal 600 mm spacing.

Each intersection of 4 panels is supported by a stainless steel corner support bracket and a locking disc, covered with a pressed stainless steel cover plate insulated with 6 mm thick Superwool Paper produced by Morgan Thermal Ceramics.

This bulkhead is fitted with an inspection hatch with clear light of 900×900 mm, with the hinge fitted on the exposed side, installed in the middle of a RAC+ panel. The hatch leaf, having dimensions of 900×900 mm, is composed of a stainless steel frame, 0.9 mm thick and, in between, the insulating material. This material is composed of two layers of Marine Board, 20 mm thick each and having a nominal density of 160 kg/m$^3$, externally facing by means of Hybrid Inorganic Polymer System (HIPS) impregnated into a fiberglass cloth and covered with a self-adhesive veneer named VentureClad-1577CW-WML. The frame is composed of a C shaped stainless steel profile having dimensions of 1000× 1000×70 mm and thickness of 0.9 mm; between the frame and the leaf a gasket type Intumescent Promaseal-LFC Fire protection laminate, having thickness of 3 mm, is fitted. The leaf is equipped with a closure system that acts on three points, actuated by a removable handle and fitted with one sliding stainless steel rod having diameter of 10 mm.

The details of the tested prototype bulkhead are provided in the table below:

TABLE 10

| Panel properties | |
|---|---|
| Property | Value |
| Nominal density | 160 kg/m$^3$ |
| Measured density | 152 kg/m$^3$ |
| Nominal thickness | 20 mm |
| Measured thickness | 20 mm |
| Measured moisture content | 0.91 dry wt % |
| Measured binder content | 6.98 dry wt % |

Test Methodology

Figure 27:
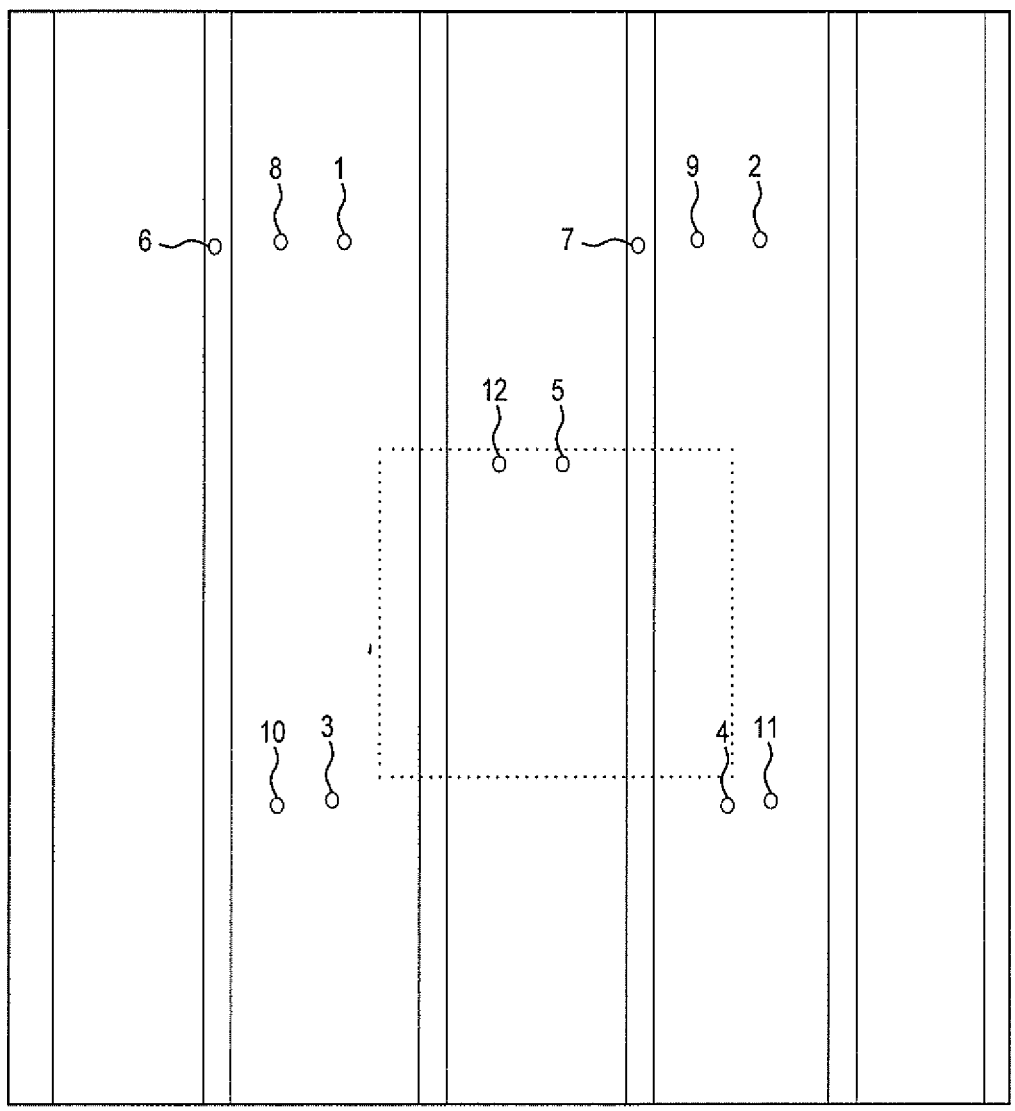
FIG. 27 is diagram showing the location of unexposed face thermocouples.
Figure 27:
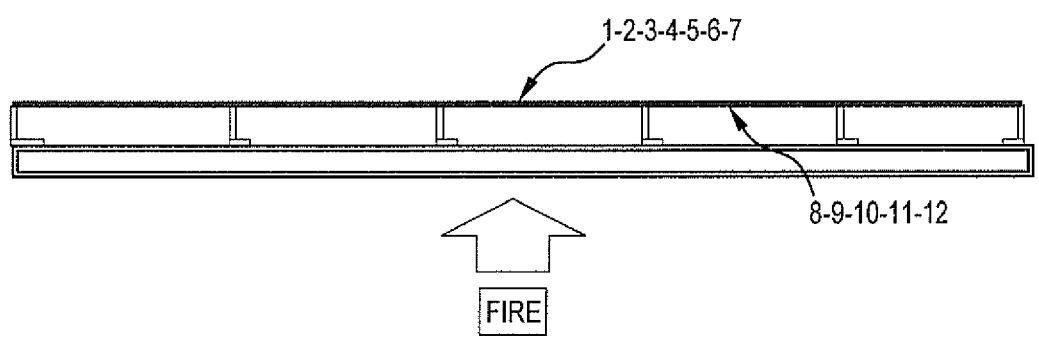

The prototype bulkhead was tested in the vertical position with the bulkhead insulated stiffened side exposed to fire. The prototype bulkhead was mounted within a steel restraint frame having a refractory concrete lining 50 mm thick. FIG. 27 shows the position of the thermocouples of the unexposed face of the bulkhead.

In FIG. 27, Thermocouples 1, 2, 3, 4, 5 are used to determine surface temperature; Thermocouples 6, 7 used to determine stiffener temperature; and Thermocouples 8, 9, 10, 11, 12 used to determine mean aluminium skin temperature on the interface with the insulating material.

Criteria for Classification

The following classification criteria as specified by the test method were used:

Insulation: requirements are satisfied if:

a) the average unexposed face temperature increases by not more than 140° C. above its initial value;

b) the temperature recorded by any of the individual unexposed face thermocouples is not in excess of 180° C. above its initial temperature;

c) the average aluminium alloy structural core temperature increases by not more than 200° C. above its initial temperature.

Integrity: requirements are satisfied if:

a) flaming on the unexposed face does not occur;

b) ignition of a cotton wool pad does not occur over cracks and openings that lead to the passage of hot gases;

c) a 6 mm-diameter gap gauge cannot be passed through the specimen such that the gauge projects into the furnace and cannot be moved a distance of 150 mm along the gap;

d) a 25 mm-diameter gap gauge cannot be passed through the specimen such that the gauge projects into the furnace.

Test Results

Figure 28:
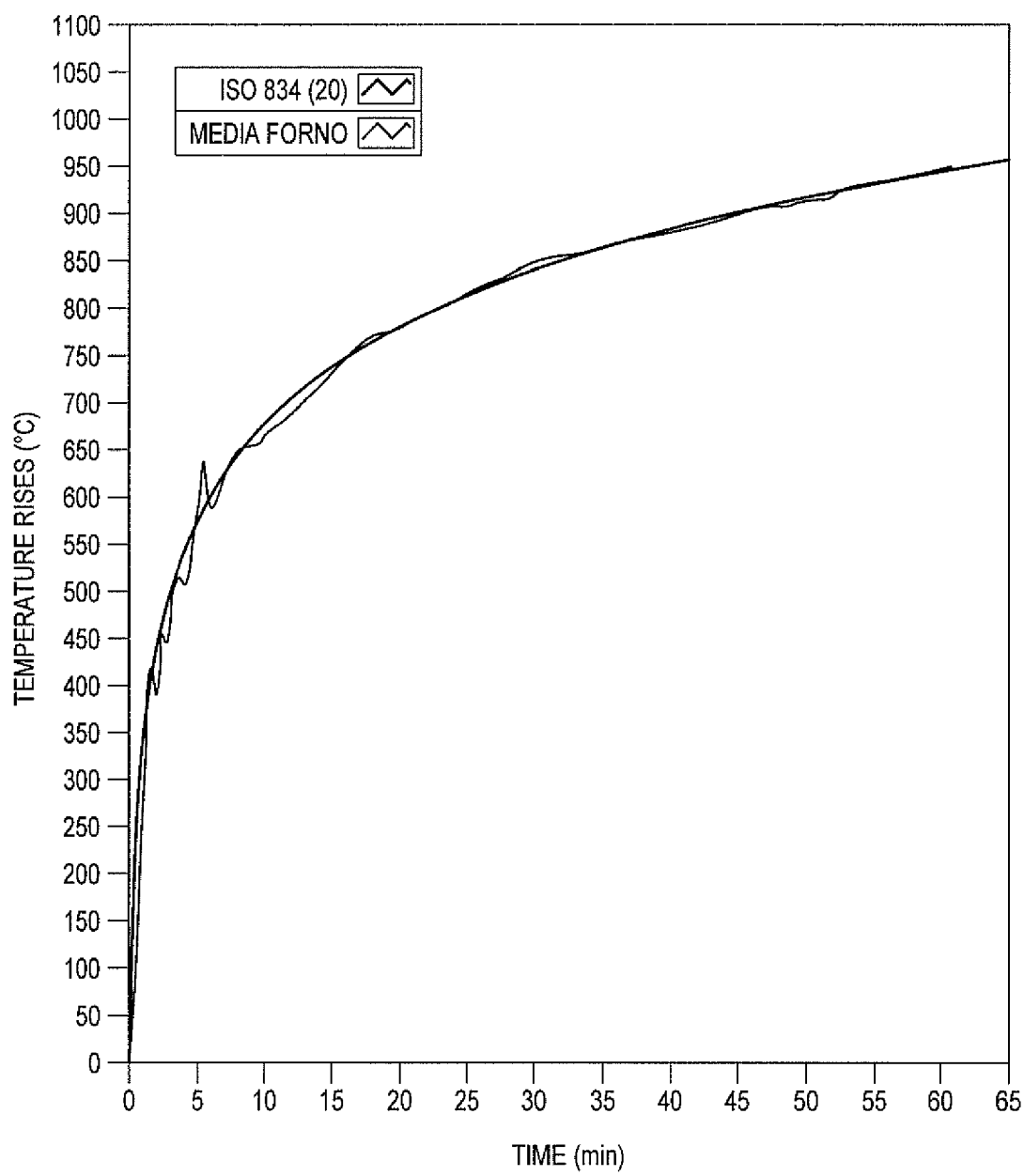
FIG. 28 is a graph showing Mean furnace temperature and the standard time/temperature curve according to Part 3 of IMO 2010 FTP Code.
Figure 29:
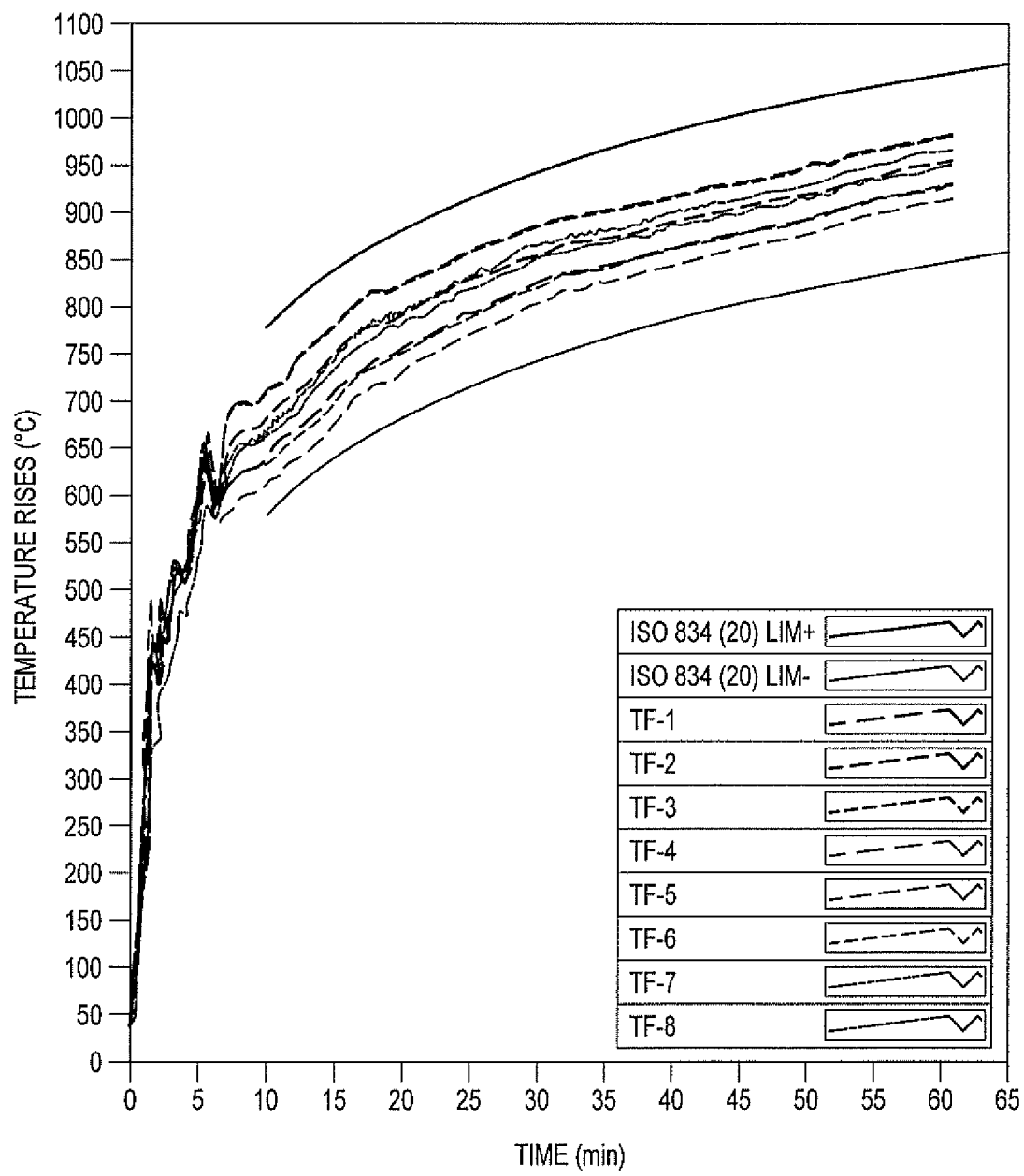
FIG. 29 is a graph showing Furnace temperatures, standard time/temperature curve according to Part 3 of IMO 2010 FTP Code and tolerance after 10 min.

The temperatures recorded by the furnace thermocouples are shown in FIG. 28 and FIG. 29.

Figure 30:
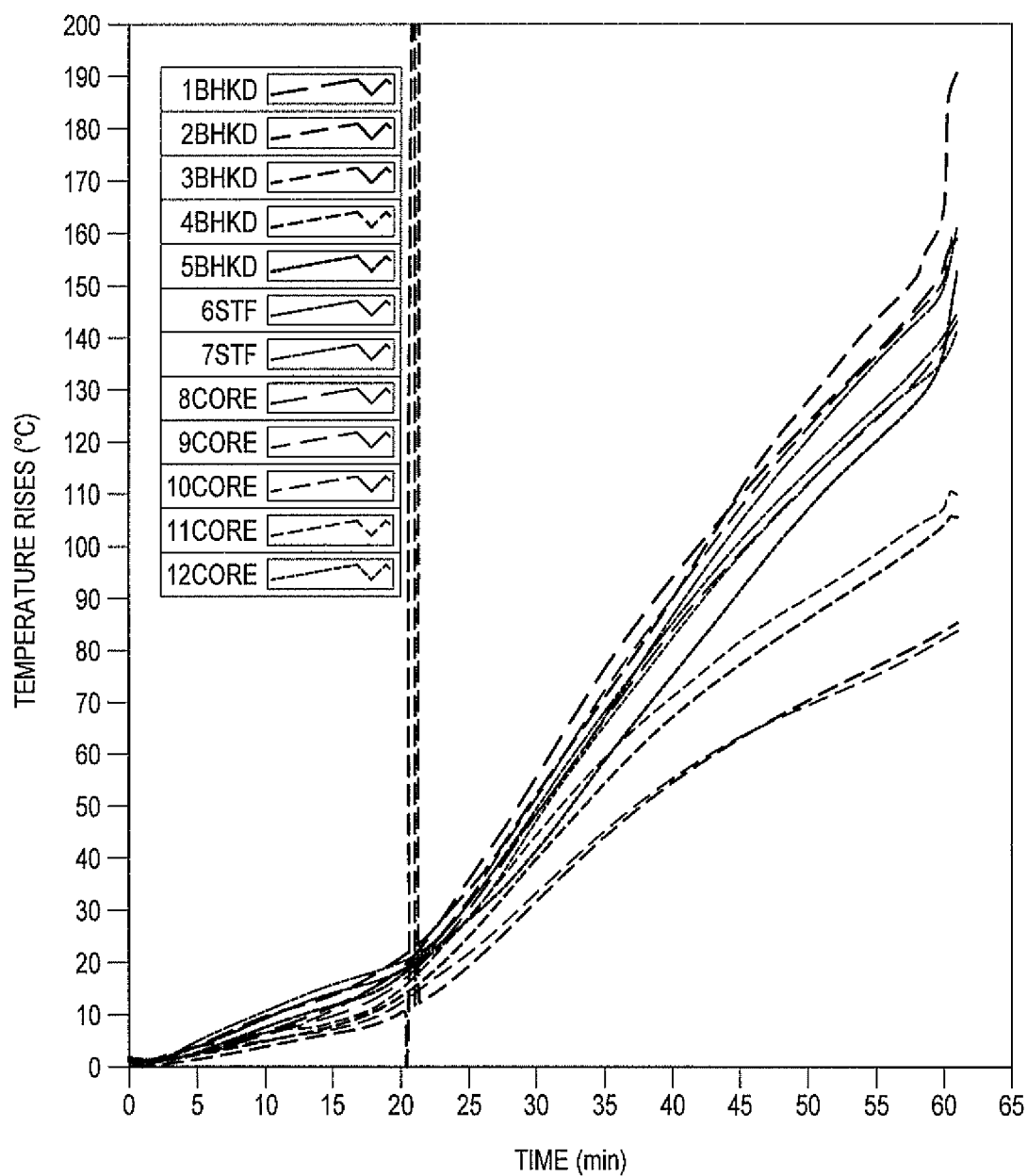
FIG. 30 is a graph showing temperature rises recorded on the unexposed face of the specimen and on the aluminium alloy structural core.
Figure 31:
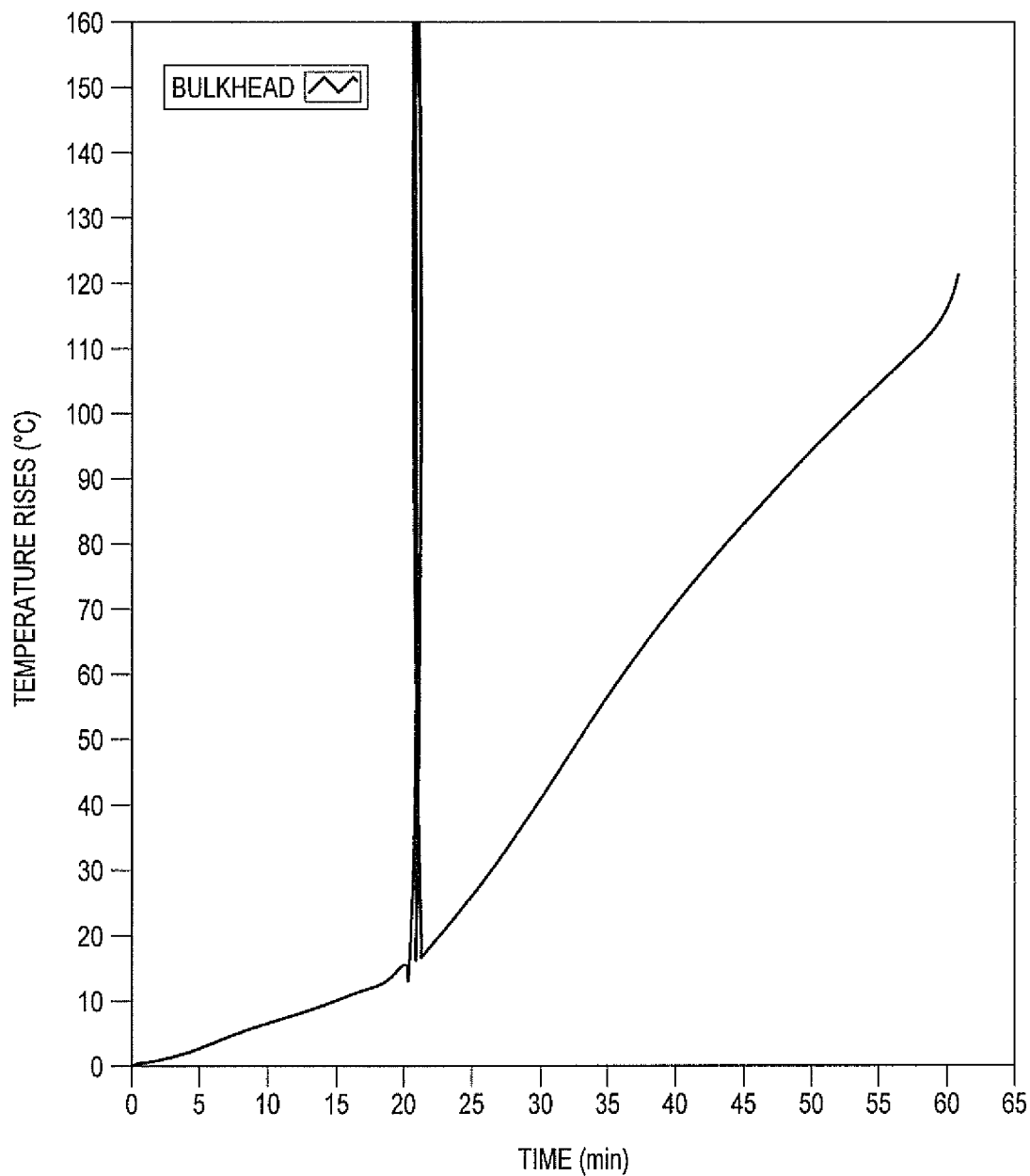
FIG. 31 is a graph showing the mean temperature rise recorded on the unexposed face of the specimen.

The temperatures recorded by the thermocouples fitted on the unexposed face of the specimen are shown in FIG. 30 and FIG. 31.

Figure 32:
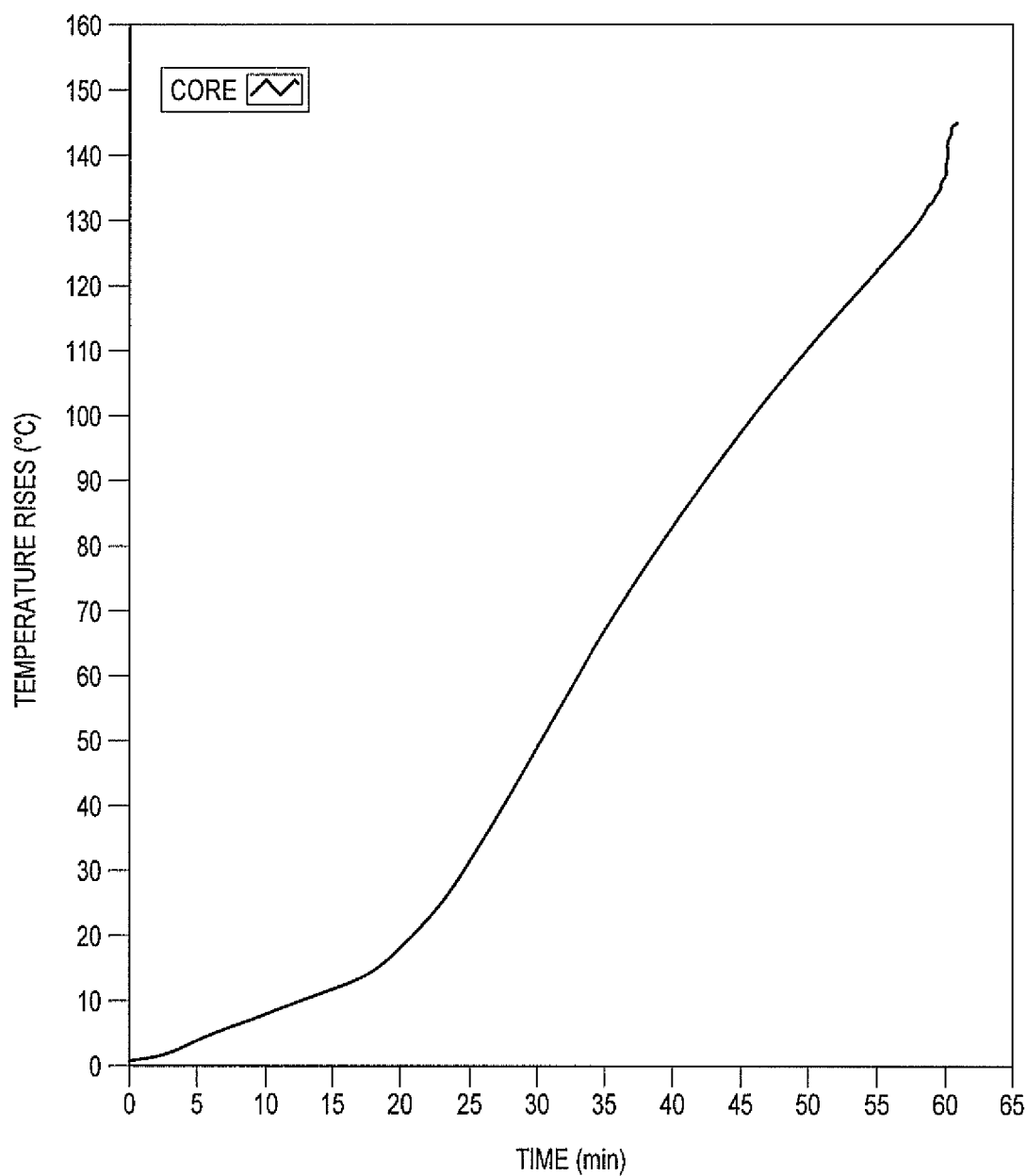
FIG. 32 is a graph showing the mean temperature rise recorded on the aluminium alloy structural core.

The temperatures recorded by the thermocouples fitted on the aluminium alloy structural core are shown in FIG. 30 and FIG. 32.

The maximum deflection of the specimen was 50 mm.

Flaming on the unexposed face did not occur.

Cracks or apertures on the specimen such to require tests with the cotton wool pad or the gap gauges were not detected.

Observations during the test: at the 21st minute poor contact of thermocouple TC3; at the 61st minute the test has been interrupted as requested by the sponsor.

Standard Fire Test 2

The purpose of the test was to determine the fire resistance of a Class A-60 load-bearing deck according to IMO FTP Code 2010 Part 3 for "A", "B" and "F" class divisions of Annex 1 of 2010 IMO FTP Code.

Description of Prototype

Aluminium deck built according to APPENDIX 1 of IMO 2010 FTPC Part 3, insulated on the stiffened side exposed to the fire with Rapid Access Composite 2 (RAC-2) deck structural fire protection system consisting of a composite panels supported by a stainless steel frame work mounted with an air gap of 300 mm between the panels and the ship deck. RAC 2 panel, having dimension of 2383×1183 mm and thickness of 25 mm, is composed of a layer of non-combustible material named Marine Panel (manufacturer Unifrax) having a nominal density of 160 kg/m³ facing on both sides by means of Hybrid Inorganic Polymer System (HIPS) impregnated into a fiberglass cloth and covered with a self-adhesive veneer named VenturetapeClad-1577CW (certified as low flame spread material). The panels are mounted on a stainless steel framework suspended below the aluminium deck using Erico Caddy M6Ti clips with a 2 mm steel leg installed onto the stiffener flange. The clips are fitted with M6 steel eye bolt with rubber grommet. 4.76 to 6 mm steel hanging rods are installed between the eye bolt and the frame work at nominal 1500 mm centres. The hanging rods are hooked into the steel grid structure which supports the panels. Additional clips are riveted to the structure where required. Joints between panels are covered with stainless steel cover strips, which are insulated with 6 mm thick Superwool Paper (density 230 kg/m³) and screwed to the frame work at nominal 600 mm spacing. Each intersection of 4 panels are supported by a stainless steel corner support bracket and locking discs and are covered with a pressed stainless steel cover plate insulated with 6 mm thick Superwool Paper. The three panels having length of 2383 mm are fitted, across the centre of the panels, with a transversal cover strip profiles, screwed to the joints and insulated with Superwool Paper.

The details of the tested prototype bulkhead are provided in the table below:

TABLE 11

Panel properties

| Property | Value |
|---|---|
| Nominal density | 160 kg/m³ |
| Measured density | 161 kg/m³ |
| Nominal thickness | 25 mm |
| Measured thickness | 25 mm |
| Measured moisture content | 0.94 dry wt % |
| Measured binder content | 7.17 dry wt % |

Test Methodology

The prototype deck has been tested in the horizontal position exposing to the fire the deck insulated stiffened side.

The prototype deck was mounted within a steel restraint frame having a refractory concrete lining 50 mm thick.

Figure 33:
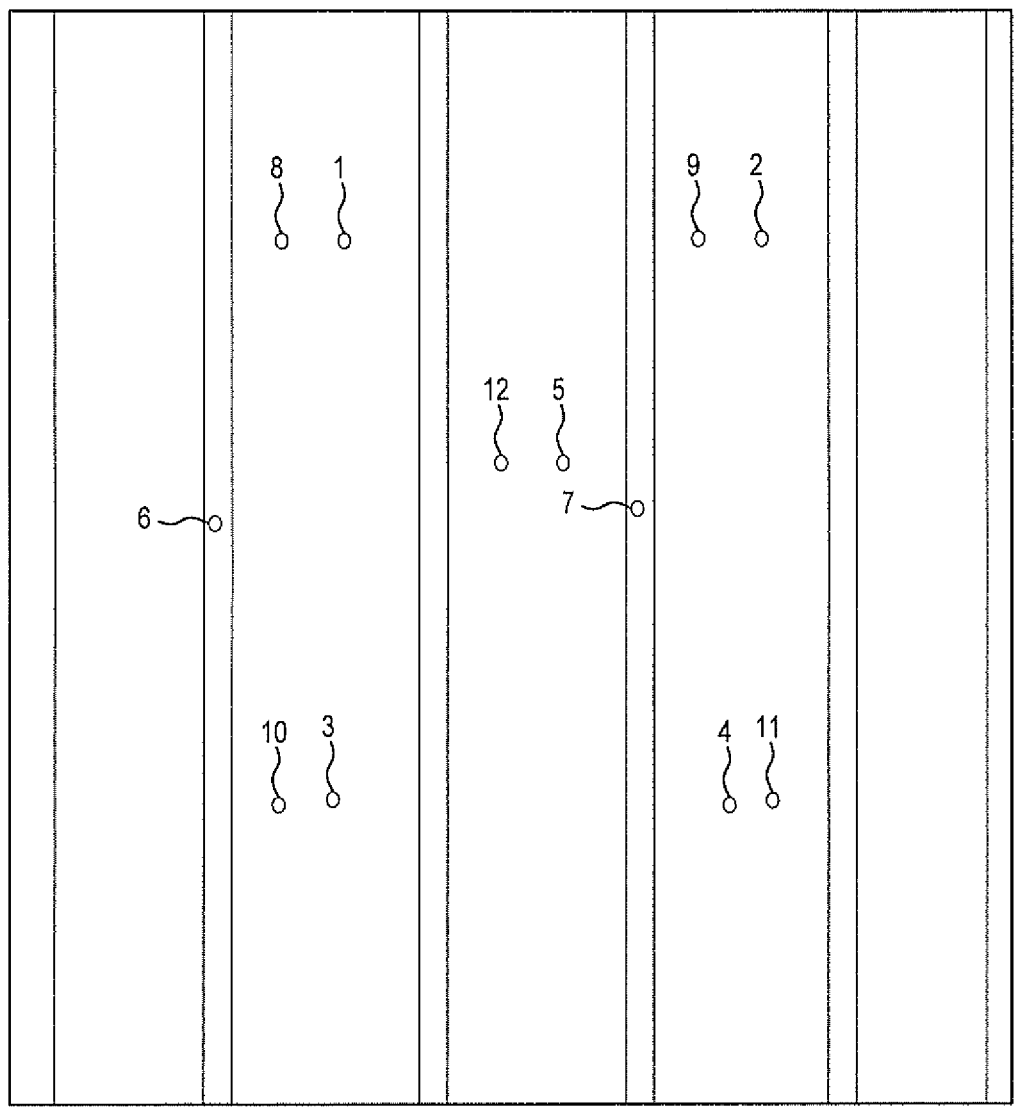
FIG. 33 is diagram showing the location of unexposed face thermocouples.
Figure 33:
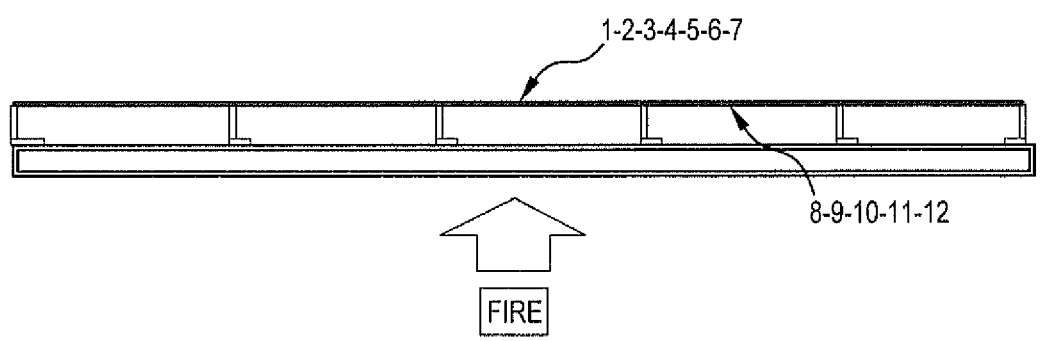

In the FIG. 33 is shown the position of the thermocouples on the unexposed face of the prototype deck.

Criteria for Classification

The following classification criteria as specified by the test method were used:

Insulation: requirements are satisfied if:
a) the average unexposed face temperature increases by not more than 140° C. above its initial value;
b) the temperature recorded by any of the individual unexposed face thermocouples is not in excess of 180° C. above its initial temperature;
c) the average aluminium alloy structural core temperature increases by not more than 200° C. above its initial temperature.

Integrity: requirements are satisfied if:
a) flaming on the unexposed face does not occur;
b) ignition of a cotton wool pad does not occur over cracks and openings that lead to the passage of hot gases;
c) a 6 mm-diameter gap gauge cannot be passed through the specimen such that the gauge projects into the furnace and cannot be moved a distance of 150 mm along the gap;
d) a 25 mm-diameter gap gauge cannot be passed through the specimen such that the gauge projects into the furnace.

Test Results

Figure 34:
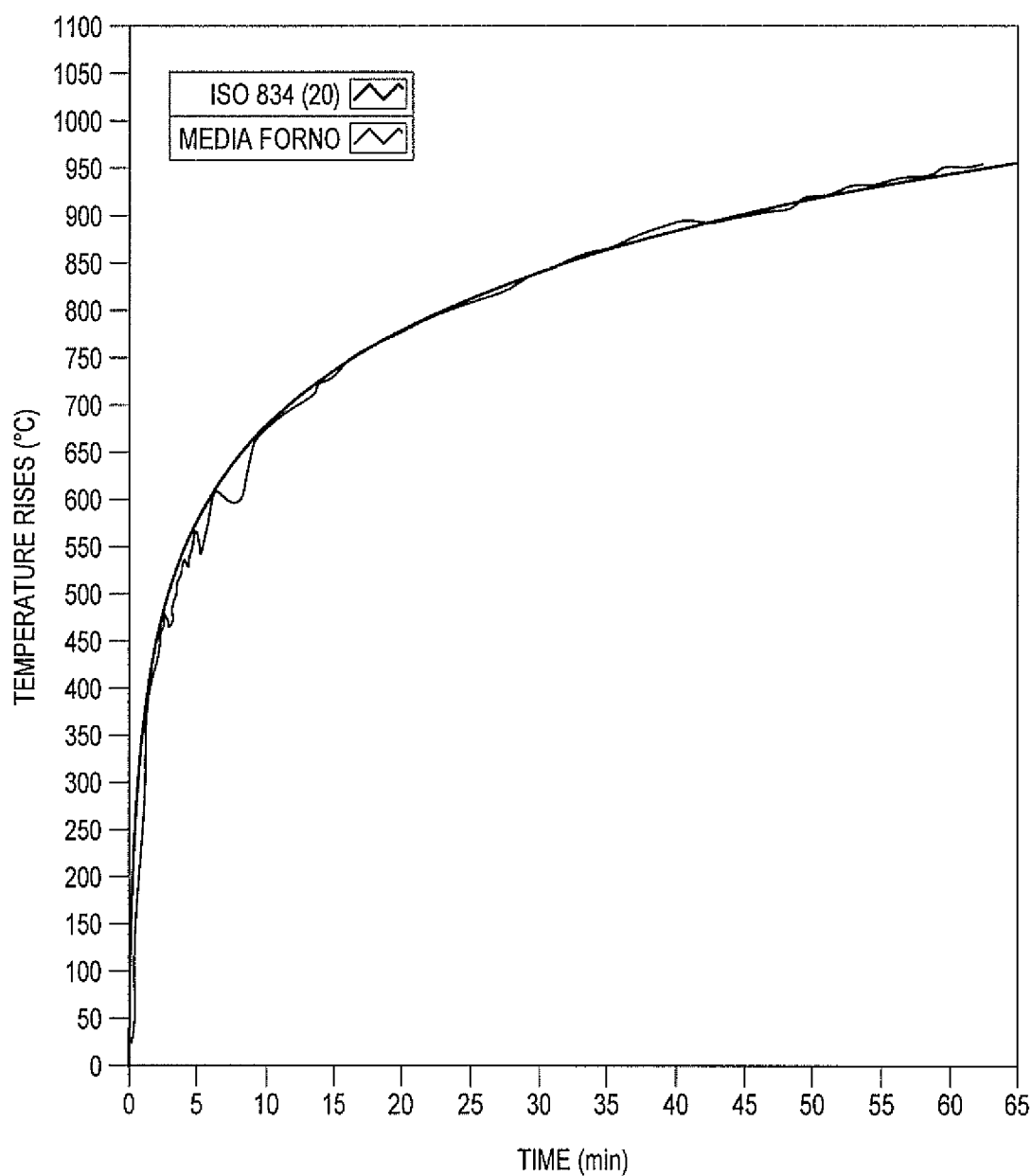
FIG. 34 is a graph showing the mean furnace temperature and the standard time/temperature curve according to Part 3 of IMO 2010 FTP Code.
Figure 35:
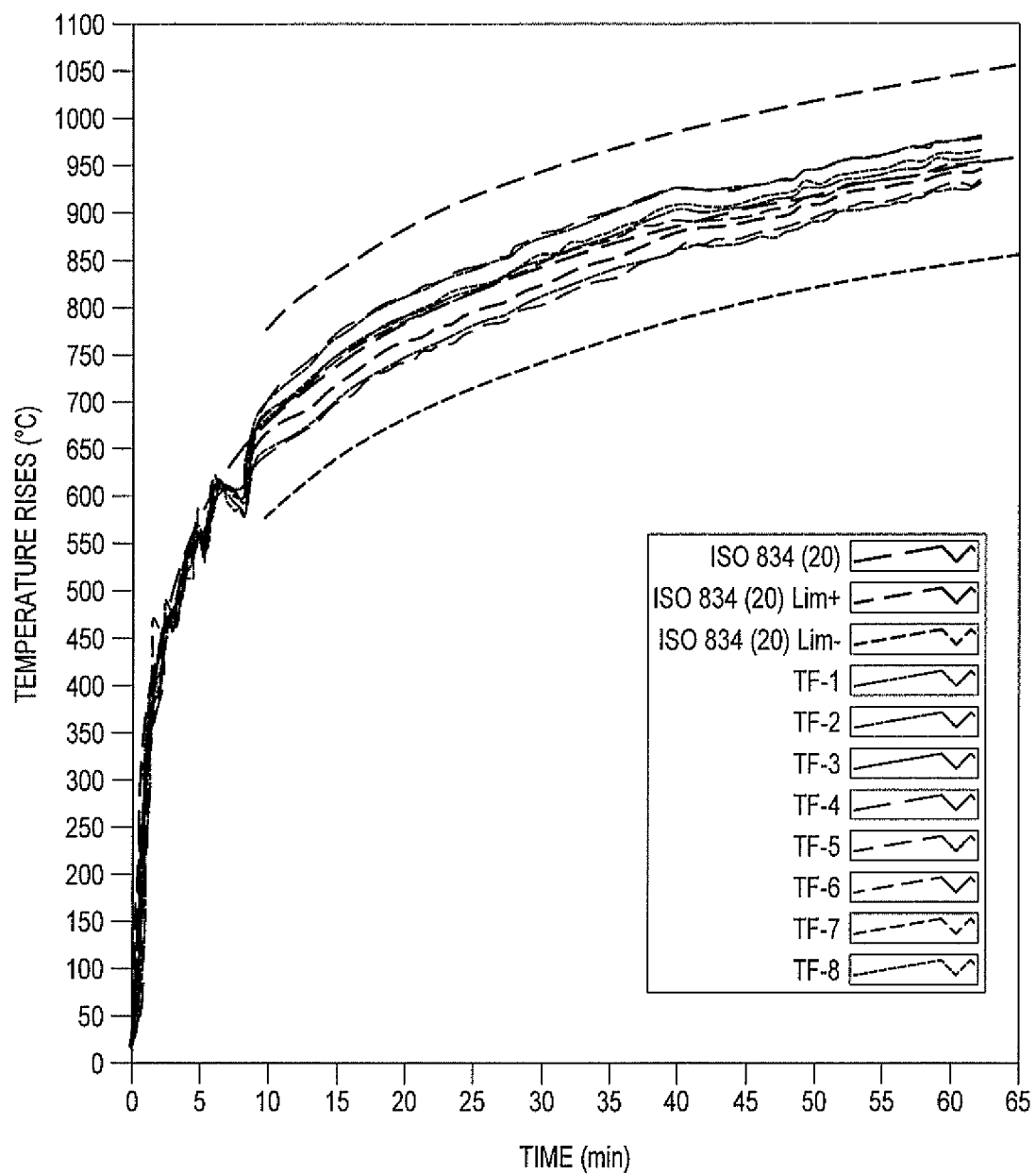
FIG. 35 is a graph showing furnace temperatures, standard time/temperature curve according to Part 3 of IMO 2010 FTP Code and tolerance after 10 min.

The temperatures recorded by the furnace thermocouples are shown in FIG. 34 and FIG. 35.

Figure 36:
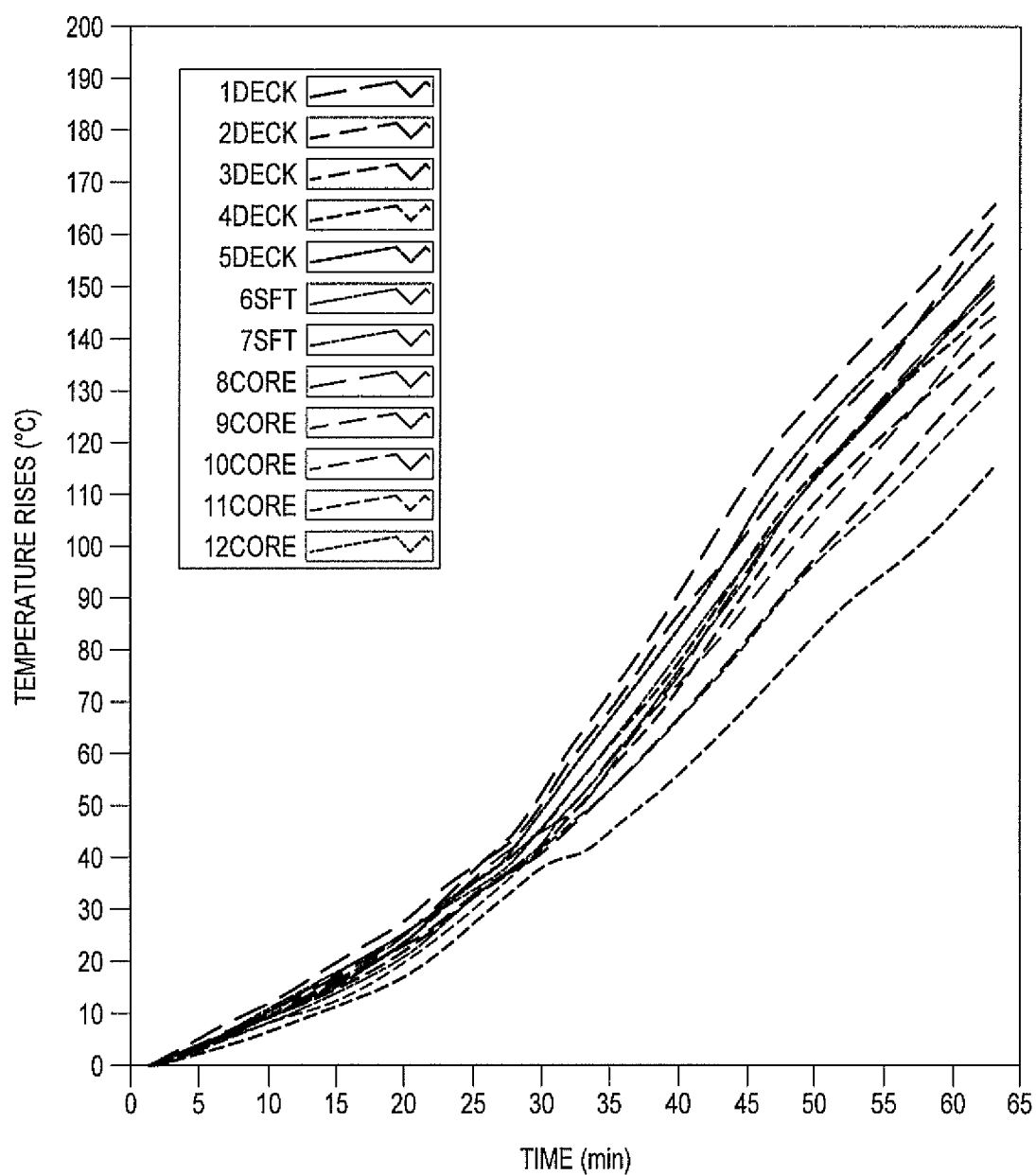
FIG. 36 is a graph showing temperature rises recorded on the unexposed face of the specimen and on the aluminium alloy structural core.
Figure 37:
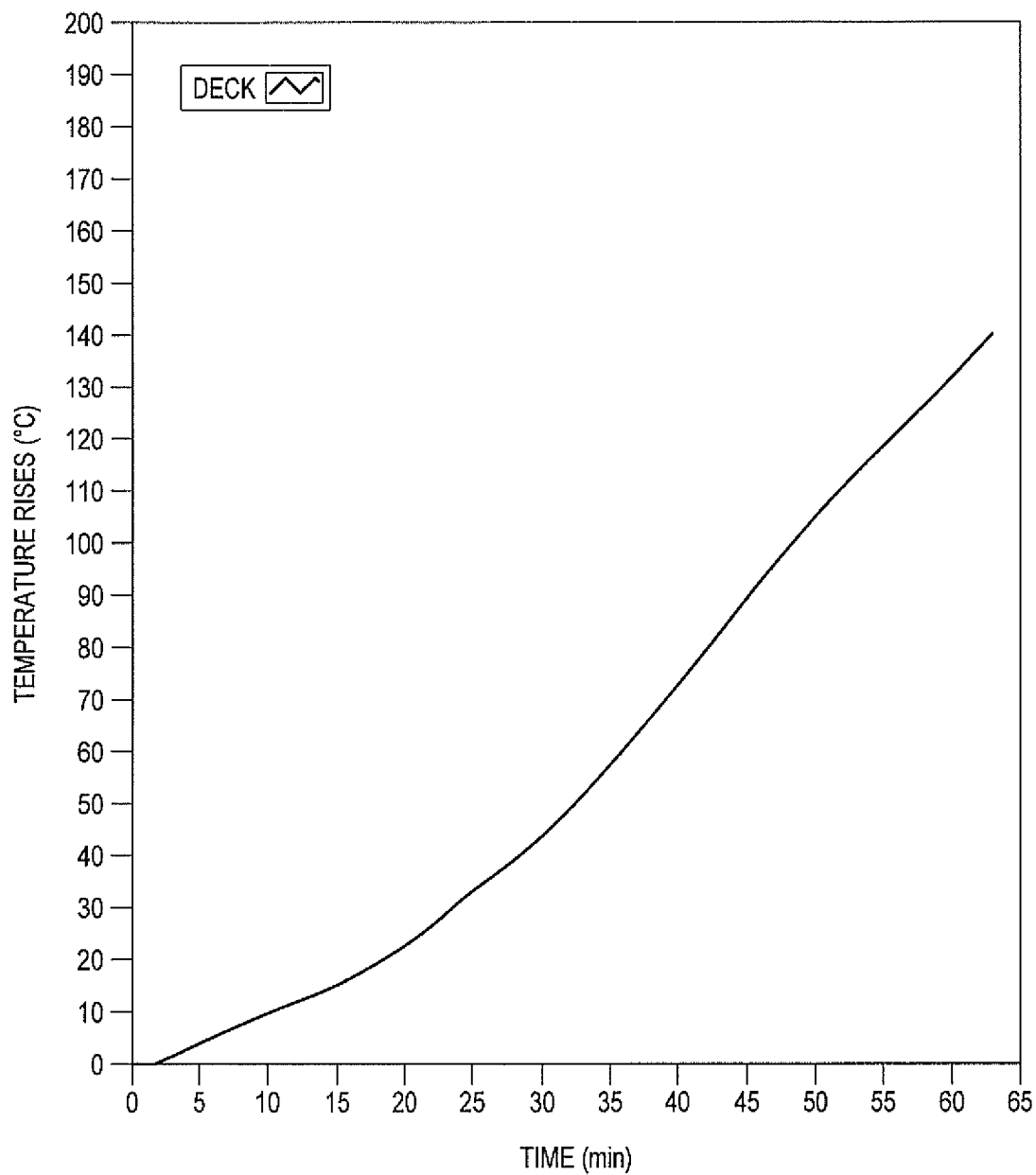
FIG. 37 is a graph showing the mean temperature rise recorded on the unexposed face of the specimen.

The temperatures recorded by the thermocouples fitted on the unexposed face of the specimen are shown in FIG. 36 and FIG. 37.

Figure 38:
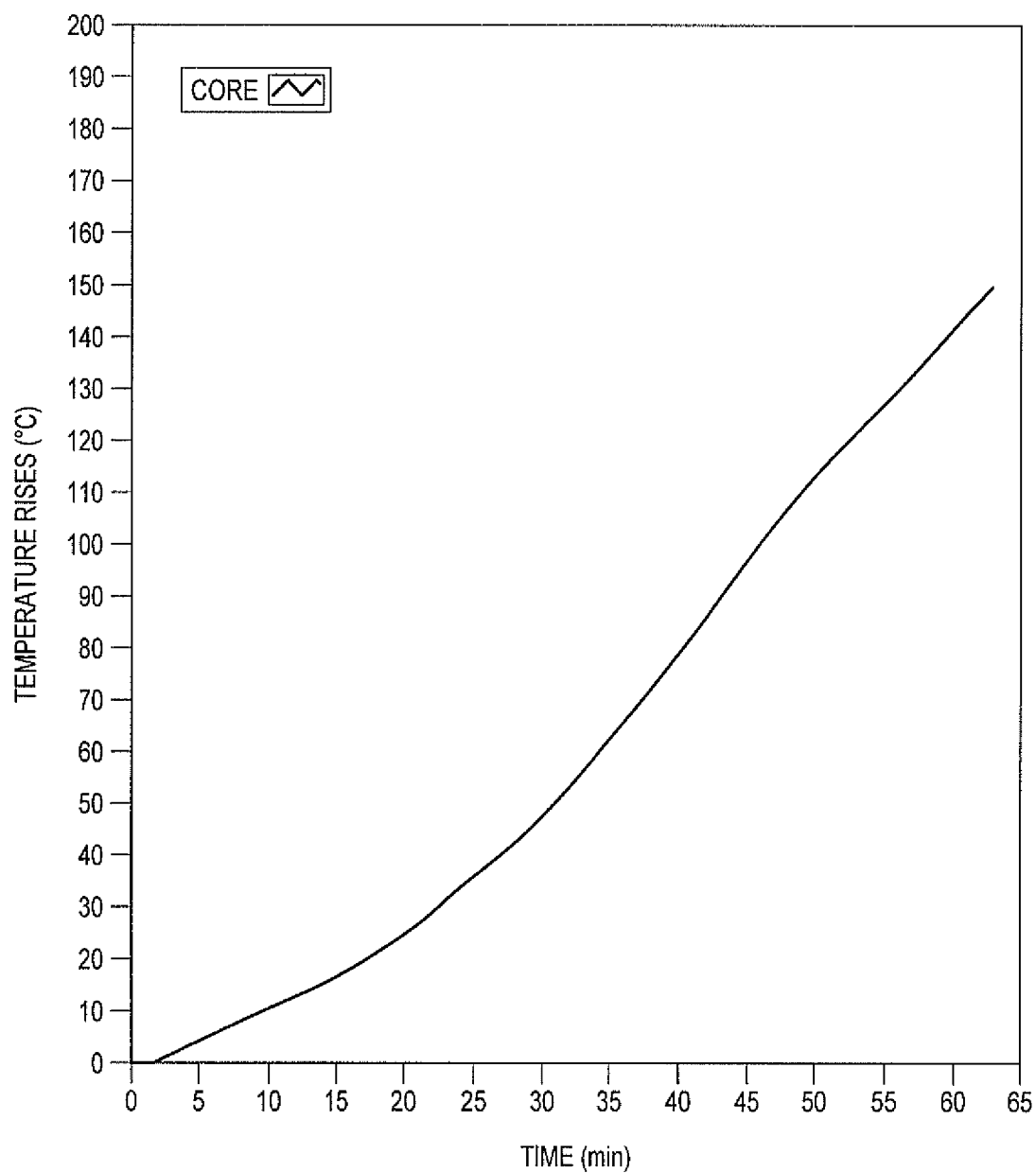
FIG. 38 is a graph showing the mean temperature rise recorded on the aluminium alloy structural core.

The temperatures recorded by the thermocouples fitted on the aluminium alloy structural core are shown in FIG. 36 and FIG. 38.

The maximum deflection of the specimen was 65 mm.

Flaming on the unexposed face did not occur.

Cracks or apertures on the specimen such to require tests with the cotton wool pad or the gap gauges were not detected.

The present invention provides an improved fire and/or thermal resistant panel, assembly and kit that is suitable for at least marine applications and provides superior performance characteristics to existing systems.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A thermal and/or fire resistant panel comprising:
   a panel body comprising a fire resistant composition, wherein the fire resistant composition comprises:
   a silane cross-linked hybrid inorganic polymer; and
   a siloxane,
   wherein the silane cross linked hybrid inorganic polymer is of Formula I:

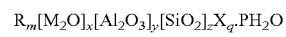
   $$R_m[M_2O]_x[Al_2O_3]_y[SiO_2]_z X_q \cdot P H_2O \quad \text{Formula I}$$

wherein:
   R represents an organic functional group;
   M is an alkali metal;
   X is selected from chlorine and fluorine;
   m is >0;
   q is ≥0;
   x is from 1 to 1.6;
   y is from 1.0;
   x/y is from 1.0 to 1.6;
   z is from 3 to 65;
   z/y is ≥1.0; and
   P is from 3 to 5, and
   wherein the thermal and/or fire resistant panel comprises less than 20 wt % organic matter,
   wherein the panel body is a thermal insulating blank and the thermal insulating blank comprises:

one or more of refractories, fibres, and amorphous alkaline earth silicates,
colloidal silica; and
starch.

2. The thermal and/or fire resistant panel of claim 1, wherein the organic functional group R is a silane of the form $R^1{}_n SiO_{4-n}$, wherein $R^1$ represents an organic moiety and n is selected from 1, 2, or 3.

3. The thermal and/or fire resistant panel of claim 1, wherein the composition comprises from about 0.5 wt % to about 5 wt % siloxane.

4. The thermal and/or fire resistant panel of claim 1, wherein the silane cross-linked hybrid inorganic polymer comprises a glycidyl silane.

5. The thermal and/or fire resistant panel of claim 1, wherein the panel is a panel of a refractory material.

6. The thermal and/or fire resistant panel of claim 1, wherein the panel does not include wood.

7. The thermal and/or fire resistant panel of claim 1, wherein the panel body is laminated with a layer of a woven material comprising the fire resistant composition.

8. The thermal and/or fire resistant panel of claim 7, wherein the layer of the woven material is selected from the group consisting of: glass fibre, carbon cloth, basalt cloth and steel mesh.

9. The thermal and/or fire resistant panel of claim 1, wherein the panel is a marine panel.

10. The thermal and/or fire resistant panel of claim 1, wherein the dimensions of the thermal and/or fire resistant panel are stable under the effects of heat in the range of 0 to 1100° C., wherein the panel is stable when one or more of the following apply
  a) the dimensions of the panel are stable;
  b) no cracks or apertures occur in the panel; and
  c) when the heat exposure is on one side of the panel one or more of the following apply:
    (i) flaming on the unexposed side of the panel does not occur;
    (ii) ignition of a cotton wool pad on the unexposed side of the panel does not occur over cracks and openings that lead to the passage of hot gases from the heat exposed side of the panel;
    (iii) a 6 mm-diameter gap gauge cannot be passed through the panel such that the gauge projects from the heat exposed side and can be moved a distance of 150 mm along the gap; and
    (iv) a 25 mm-diameter gap gauge cannot be passed through the panel such that the gauge projects from the heat exposed side.

11. The thermal and/or fire resistant panel of claim 1, wherein fire resistant panel has dimensions of up to about 1200 mm×up to about 2400 mm×up to about 25 mm.

12. The thermal and/or fire resistant panel of claim 1, wherein at least one surface of the panel is lined, treated, coated or impregnated with the fire resistant composition.

13. The thermal and/or fire resistant panel of claim 1, wherein the panel body is a laminate and the laminate shows no sign of laminate destruction after 42 days immersion in 3.5% salt solution.

14. The thermal and/or fire resistant panel of claim 1, wherein the siloxane is one or more of liquid oligomeric siloxane, silanol terminated polydimethyl siloxane, isobutyl-triethoxysilane, and tripotassium propylsilane triolate.

15. The thermal and/or fire resistant panel of claim 1, wherein the thermal insulating blank is a compressed fibre board of refractory fibres.

16. The thermal and/or fire resistant panel of claim 1, wherein the thermal insulating blank has a thermal conductivity value of less than 0.3 W/m·K at temperatures at 1000° C. or less.

17. The thermal and/or fire resistant panel of claim 1, wherein the panel further comprises a vapour barrier layer on at least one or more faces of the panel body.

* * * * *